US011533674B2

(12) United States Patent
Itagaki et al.

(10) Patent No.: US 11,533,674 B2
(45) Date of Patent: Dec. 20, 2022

(54) INFORMATION PROCESSING APPARATUS

(71) Applicant: SONY CORPORATION, Tokyo (JP)

(72) Inventors: Takeshi Itagaki, Saitama (JP); Yuichi Morioka, Kanagawa (JP); Tomoya Yamaura, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/528,528

(22) PCT Filed: Dec. 25, 2015

(86) PCT No.: PCT/JP2015/086249
§ 371 (c)(1),
(2) Date: May 22, 2017

(87) PCT Pub. No.: WO2016/136116
PCT Pub. Date: Sep. 1, 2016

(65) Prior Publication Data
US 2017/0257817 A1 Sep. 7, 2017

(30) Foreign Application Priority Data

Feb. 27, 2015 (JP) .............................. JP2015-038288

(51) Int. Cl.
H04W 4/00 (2018.01)
H04W 48/08 (2009.01)
(Continued)

(52) U.S. Cl.
CPC ............ H04W 48/08 (2013.01); H04L 69/22 (2013.01); H04L 69/321 (2013.01);
(Continued)

(58) Field of Classification Search
CPC . H04W 48/08; H04W 72/1263; H04W 84/12; H04L 69/321; H04L 69/22;
(Continued)

(56) References Cited

U.S. PATENT DOCUMENTS 8,787,346 B2 7/2014 Doi et al.
9,942,193 B1 * 4/2018 Chu .................... H04L 61/2038
(Continued)

FOREIGN PATENT DOCUMENTS

JP 2005-73156 A 3/2005
JP 2005-537717 A 12/2005
(Continued)

OTHER PUBLICATIONS

Juniper Network, "Understanding the Network Terms SSID, BSSID, and ESSID", Jan. 22, 2018 (Year: 2018).*
(Continued)

Primary Examiner — Mang Hang Yeung
(74) Attorney, Agent, or Firm — Xsensus LLP

(57) ABSTRACT

An information processing apparatus including a control unit. In a case where a first physical layer network identifier for identifying a first network to which an apparatus in question belongs is determined to match a second physical layer network identifier for identifying a second network to which the apparatus in question does not belong, the control unit changes a first physical layer network identifier. Then, the control unit transmits the change information relating to the change to another information processing apparatus. Further, in a case where change information for changing a first physical layer network identifier for identifying a first network to which the apparatus in question belongs is received from another information processing apparatus which belongs to the first network, the control unit changes a condition for terminating reception processing of a packet on the basis of the change information in a middle of the reception processing.

9 Claims, 26 Drawing Sheets

(51) Int. Cl.
*H04W 84/12* (2009.01)
*H04L 69/321* (2022.01)
*H04L 69/324* (2022.01)
*H04L 69/325* (2022.01)
*H04L 69/22* (2022.01)
*H04W 72/12* (2009.01)

(52) U.S. Cl.
CPC .......... *H04L 69/324* (2013.01); *H04L 69/325* (2013.01); *H04W 72/1263* (2013.01); *H04W 84/12* (2013.01); *Y02D 30/70* (2020.08)

(58) Field of Classification Search
CPC ..... H04L 69/324; H04L 69/325; Y02D 70/21; Y02D 70/164; Y02D 70/142; Y02D 70/22; Y02D 70/00
USPC .......................................................... 370/338
See application file for complete search history.

(56) References Cited

U.S. PATENT DOCUMENTS

| | | | |
|---|---|---|---|
| 2005/0047385 A1 | 3/2005 | Otsuka | |
| 2006/0126555 A1 | 6/2006 | Wang et al. | |
| 2009/0323667 A1 | 12/2009 | Doi et al. | |
| 2012/0177025 A1 | 7/2012 | Huang et al. | |
| 2017/0105143 A1* | 4/2017 | Seok | H04W 80/02 |
| 2018/0270038 A1* | 9/2018 | Oteri | H04L 5/0037 |

FOREIGN PATENT DOCUMENTS

| | | |
|---|---|---|
| JP | 2008-61233 A | 3/2008 |
| JP | 2008-219600 A | 9/2008 |
| JP | 2010-35012 A | 2/2010 |
| JP | 2011-023873 A | 2/2011 |
| JP | 2012-019468 A | 1/2012 |
| JP | 2013-529031 A | 7/2013 |
| JP | 2014-236363 A | 12/2014 |

OTHER PUBLICATIONS

Matthew Fischer, et al., "CID 205 BSSID Color Bits," IEEE 802.11-13/1207r1, Sep. 16, 2013, (20 pages).
Jun-Hyung Son, et al., "Further Considerations on Enhanced CCA for 11ax," IEEE 802.11-14/0847r1, Jul. 15, 2014, (12 pages).
Koichi Ishihara, et al., "Consideration of asynchronous interference in OBSS environment," IEEE 802.11-14/1148r1, Sep. 16, 2014, (10 pages).
"Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 6: Sub 1 GHz License Exempt Operation," IEEE P802.11ah™/D2.0, Jun. 2014, (582 pages).
International Search Report dated Feb. 2, 2016 in PCT/JP2015/086249 filed Dec. 25, 2015.
Extended European Search Report dated Oct. 1, 2018 in European Application No. 15883406.9.
Partial Supplementary European Search Report dated Jun. 21, 2018 in Patent Application No. 15883406.9, 12 pages.
Communication pursuant to Article 94(3) EPC, dated Aug. 6, 2019, issued in corresponding European Patent Application No. 15 883 406.9-1213.
Japanese Office Action dated Aug. 27, 2019, issued in corresponding Japanese Patent Application No. 2017-501881.

\* cited by examiner

FIG. 3
EXAMPLE OF FORMAT OF PLCP HEADER
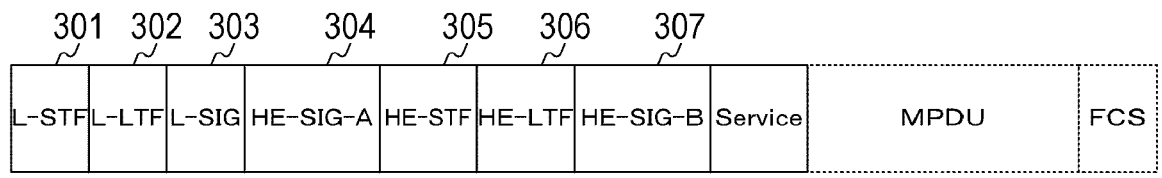
a
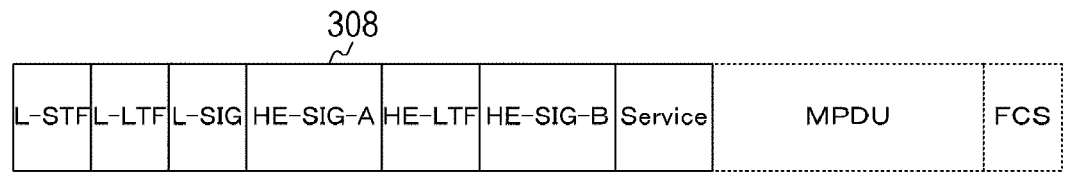
b
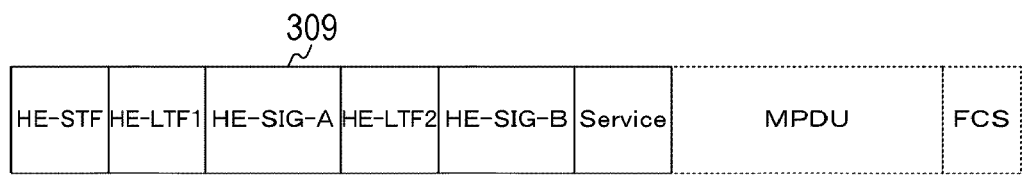
c
d

EXAMPLE OF FORMAT OF COLOR INFORMATION SHARING FRAME

EXAMPLE OF FORMAT OF COLOR MONITOR RESULT NOTIFICATION FRAME

EXAMPLE OF FORMAT OF BEACON FRAME

EXAMPLE OF OPERATION OF COLOR UPDATE REFLECTION PROCESSING

EXAMPLE OF FORMAT OF COLOR OVERLAPPING DETECTION REPORT FRAME

EXAMPLE OF OPERATION OF COLOR OVERLAPPING
DETECTION PROCESSING (MASTER STATION)

EXAMPLE OF FORMAT OF BEACON FRAME

EXAMPLE OF OPERATION OF UPDATE PROCESSING OF RECEPTION REQUIRED CONDITION

EXAMPLE OF FORMAT OF COLOR INFORMATION OBTAINING REQUEST FRAME

EXAMPLE OF FORMAT OF COLOR INFORMATION OBTAINING RESPONSE FRAME

EXAMPLE OF OPERATION OF COLOR RECOVERY PROCESSING (MASTER STATION)

EXAMPLE OF FORMAT OF COLOR OPERATION START REQUEST FRAME

EXAMPLE OF OPERATION OF COLOR OPERATION START REQUEST PROCESSING (MASTER STATION)

INFORMATION PROCESSING APPARATUS

TECHNICAL FIELD

The present invention relates to an information processing apparatus. More specifically, the present invention relates to an information processing apparatus for exchanging information using wireless communication.

BACKGROUND ART

Conventionally, there is a wireless communication technique that exchanges information using wireless communication. For example, the standard Institute of Electrical and Electronic Engineers (IEEE) 802.11 related to wireless local area network (LAN) has been spreading.

In addition, in IEEE 802.11 standardization, a technique has been proposed in which a network identifier is added in a Physical Layer Convergence Protocol (PLCP) header, and unnecessary reception is terminated at an early stage (for example, see Non-Patent Document 1). In this technique, unnecessary reception from those other than the wireless network to which the apparatus belongs is terminated at an early stage on the basis of the network identifier added in the PLCP header. Note that the network identifier added in the PLCP header is also referred to as Basic Service Set (BSS) COLOR.

CITATION LIST

Patent Document

Non-Patent Document 1: 802.11ah-D2.0

SUMMARY OF THE INVENTION

Problems to be Solved by the Invention

In the above-described conventional technique, since unnecessary reception can be terminated at an early stage, power consumption can be reduced, and the probability of successful reception of a desired packet can be increased.

In this case, a COLOR field in which the BSS COLOR is stored is a field existing in a header having restriction in a large bit length which is called a physical layer. For this reason, choices of possible values of BSS COLOR are limited. For example, in the case of Non-Patent Document 1, the COLOR field is 3 bits, and there are only 8 possible choices. In addition, the BSS COLOR is determined independently by the master station (access point). Therefore, BSS COLORs may overlap between multiple BSSes (OBSSes) in which communication ranges overlap each other. In this way, when the BSS COLORs overlap, filtering of the packets cannot be performed appropriately, and there is a possibility that the packet cannot be terminated at an early stage. Therefore, it is important to properly filter packets and to properly terminate unnecessary reception.

The present technology has been made in view of such a situation, and it is an object of this technique to appropriately terminate the reception of packets.

Solutions to Problems

The present technology is made in order to solve the above-mentioned problem, and a first aspect of the present technology is an information processing apparatus including a control unit, in which in a case where a first physical layer network identifier for identifying a first network to which an apparatus in question belongs is determined to match a second physical layer network identifier for identifying a second network to which the apparatus in question does not belong, the control unit changes the first physical layer network identifier and performs control to transmit change information about the change to another information processing apparatus, and the first aspect of the present technology also includes an information processing method, and a program for causing a computer to execute the method. Accordingly, this has an effect in that, in a case where the first physical layer network identifier and the second physical layer network identifier are determined to match each other, the first physical layer network identifier is changed, and the change information about the change is transmitted to another information processing apparatus.

Furthermore, in the first aspect, in a case where a value of the first physical layer network identifier existing in a physical header of a received packet is the same as a value of the first physical layer network identifier used in the first network, and a value of a data link layer network identifier existing in a MAC header is different from a value of a data link layer network identifier for identifying the first network, the control unit may determine that the first physical layer network identifier and the second physical layer network identifier match each other. Accordingly, this has an effect in that the first physical layer network identifier and the second physical layer network identifier are determined to match each other on the basis of the value of the physical layer network identifier and the value of the data link layer network identifier.

Furthermore, in the first aspect, in a case where information about a physical layer network identifier described in a payload of a received beacon packet is the same as information about the first physical layer network identifier used in the first network, and information about a data link layer network identifier existing in a MAC header is different from information about a data link layer network identifier for identifying the first network, the control unit may determine that the first physical layer network identifier and the second physical layer network identifier match each other. Accordingly, this has an effect in that the first physical layer network identifier and the second physical layer network identifier are determined to match each other on the basis of the value of the physical layer network identifier and the value of the data link layer network identifier.

Furthermore, in the first aspect, in a case where the control unit receives a match detection notification of the first physical layer network identifier and the second physical layer network identifier from another information processing apparatus which belongs to the first network, the control unit may determine that the first physical layer network identifier and the second physical layer network identifier match each other. Accordingly, this has an effect in that, in a case where a match detection notification of the first physical layer network identifier and the second physical layer network identifier is received from another information processing apparatus which belongs to the first network, the first physical layer network identifier and the second physical layer network identifier are determined to match each other.

Furthermore, in the first aspect, on the basis of notification information transmitted from another information processing apparatus which belongs to another network including the second network, the control unit may extract a physical layer network identifier used in the another network, and adopt a physical layer network identifier other than the extracted physical layer network identifier as a changed first physical layer network identifier. Accordingly, this has an effect in that, on the basis of the notification information transmitted from another information processing apparatus which belongs to another network, a physical layer network identifier used in the another network is extracted, and a physical layer network identifier other than the extracted physical layer network identifier is adopted as a changed first physical layer network identifier.

Furthermore, in the first aspect, the control unit may randomly set a monitor time of the notification information for extracting a physical layer network identifier used in the another network. Accordingly, this has an effect in that a monitor time of the notification information for extracting a physical layer network identifier used in the another network is randomly set.

Furthermore, in the first aspect, in a case where there does not exist any physical layer network identifier other than the extracted physical layer network identifier, the control unit may adopt, as a changed first physical layer network identifier, a physical layer network identifier used in a network including another information processing apparatus transmitting notification information with a least reception strength. Accordingly, this has an effect in that, in a case where there does not exist any physical layer network identifier other than the extracted physical layer network identifier, a physical layer network identifier used in a network including another information processing apparatus transmitting notification information with a least reception strength is adopted as a changed first physical layer network identifier.

Furthermore, in the first aspect, in a case where the first physical layer network identifier and the second physical layer network identifier match each other, the control unit does not have to change the first physical layer network identifier when notification information transmitted from another information processing apparatus which belongs to the second network includes change information for changing the second physical layer network identifier. Accordingly, this has an effect in that, in a case where the first physical layer network identifier and the second physical layer network identifier match each other, the first physical layer network identifier is not changed when notification information transmitted from another information processing apparatus which belongs to the second network includes change information for changing the second physical layer network identifier.

Furthermore, in the first aspect, the control unit may transmit the change information including designation information for designating any one of a start timing for starting use of the changed first physical layer network identifier and an end timing for ending use of the not-yet-updated first physical layer network identifier. Accordingly, this has an effect in that the change information is transmitted in such a manner the change information includes designation information for designating any one of a start timing for starting use of the changed first physical layer network identifier and an end timing for ending use of the not-yet-updated first physical layer network identifier.

Furthermore, in the first aspect, in a case where there exists an information processing apparatus which belongs to the first network and which is in a Power Save state, the control unit may set a time equal to or more than a DTIM interval as a time from the start timing to the end timing. Accordingly, this has an effect in that in a case where there exists an information processing apparatus which belongs to the first network and which is in a Power Save state, a time equal to or more than a DTIM interval is set as a time from the start timing to the end timing.

Furthermore, in the first aspect, the control unit may transmit the change information with a beacon in which information about the first physical layer network identifier is not stored in a physical header. Accordingly, this has an effect in that the change information is transmitted with a beacon in which information about the first physical layer network identifier is not stored in a physical header.

Furthermore, in the first aspect, before the control unit receives a packet in which the changed first physical layer network identifier is applied to the physical header from all of the information processing apparatuses which belong to the first network, the control unit may adopt, as a reception target, a packet applied with any one of the not-yet-changed first physical layer network identifier and the changed first physical layer network identifier. Accordingly, this has an effect in that, before a packet in which the changed first physical layer network identifier is applied to the physical header is received from all of the information processing apparatuses which belong to the first network, a packet applied with any one of the not-yet-changed first physical layer network identifier and the changed first physical layer network identifier is adopted as a reception target.

Furthermore, in the first aspect, in response to a request from another information processing apparatus which belongs to the first network, the control unit may transmit information about the first physical layer network identifier to the another information processing apparatus. Accordingly, this has an effect in that, in response to a request from another information processing apparatus which belongs to the first network, information about the first physical layer network identifier is transmitted to the another information processing apparatus.

Further, a second aspect of the present technology is an information processing apparatus including a control unit, in which in a case where change information for changing a first physical layer network identifier for identifying a first network to which an apparatus in question belongs is received from another information processing apparatus which belongs to the first network, the control unit performs control to change a condition for terminating reception processing of a packet on the basis of the change information in a middle of the reception processing, and the second aspect of the present technology also includes an information processing method, and a program for causing a computer to execute the method. Accordingly, this has an effect in that, in a case where the change information for changing the first physical layer network identifier is received from another information processing apparatus, the condition for terminating reception processing of a packet is changed on the basis of the change information in a middle of the reception processing.

Furthermore, in the second aspect, in a case where the change information includes designation information for designating a start timing for starting use of the changed first physical layer network identifier, the control unit may perform reception processing of a packet in which the changed first physical layer network identifier is included in a physical header after the start timing. Accordingly, this has an effect in that, in a case where the change information includes designation information for designating a start timing for starting use of the changed first physical layer network identifier, reception processing is performed to receive a packet in which the changed first physical layer network identifier is included in a physical header after the start timing.

Furthermore, in the second aspect, in a case where the change information includes designation information for designating an end timing for ending use of the changed first physical layer network identifier, the control unit may perform reception processing of a packet in which the not-yet-changed first physical layer network identifier is included in a physical header until the end timing. Accordingly, this has an effect in that, in a case where the change information includes designation information for designating an end timing for ending use of the changed first physical layer network identifier, reception processing is performed to receive a packet in which the not-yet-changed first physical layer network identifier is included in a physical header until the end timing.

Furthermore, in the second aspect, in a case where the control unit is unable to receive, from the another information processing apparatus, a packet in which the first physical layer network identifier is included in the physical header for a certain period of time, the control unit may transmit a request information to the another information processing apparatus in order to confirm the first physical layer network identifier. Accordingly, this has an effect in that, in a case where a packet in which the first physical layer network identifier is included in the physical header cannot be received from the another information processing apparatus for a certain period of time, a request information is transmitted to the another information processing apparatus in order to confirm the first physical layer network identifier.

Furthermore, in the second aspect, while the control unit waits for a response to the request information, the control unit may perform reception processing of all the detected packets. Accordingly, this has an effect in that, while waiting for a response to the request information, reception processing is performed to receive all the detected packets.

Furthermore, in the second aspect, in a case where it is detected that the first physical layer network identifier matches a second physical layer network identifier for identifying a second network to which the apparatus in question does not belong, notification information for notifying the detection result may be transmitted to the another information processing apparatus. Accordingly, this has an effect in that, in a case where it is detected that the first physical layer network identifier matches the second physical layer network identifier, notification information for notifying the detection result is transmitted to the another information processing apparatus.

Furthermore, in the second aspect, in a case where a value of the first physical layer network identifier existing in a physical header is the same as a value of the first physical layer network identifier used in the first network, and a packet in which a value of a data link layer network identifier existing in a MAC header and a value of a data link layer network identifier for identifying the first network are different from each other is received, the control unit may detect that that the first physical layer network identifier matches the second physical layer network identifier. Accordingly, this has an effect in that it is detected that the first physical layer network identifier matches the second physical layer network identifier on the basis of the value of the physical layer network identifier and the value of the data link layer network identifier.

Effects of the Invention

The present technology can achieve an excellent effect in that reception of packets can be appropriately terminated. It should be noted that the effects described herein are not necessarily limited, and any of the effects described in the present disclosure may be achieved.

BRIEF DESCRIPTION OF DRAWINGS

FIG. 3 is a diagram showing an example of a format of a PLCP header exchanged between the apparatuses constituting the communication system 10 according to the first embodiment of the present technology.

MODE FOR CARRYING OUT THE INVENTION

Hereinafter, a mode for carrying out the present technology (hereinafter referred to as "embodiment") will be described. The description will be given in the following order.
1. First embodiment (Example in which master station detects overlapping of BSS COLORs and decides new COLOR)
2. Second embodiment (Example in which slave station detects overlapping of BSS COLORs and master station decides new COLOR)
3. Third embodiment (Example of performing COLOR recovery processing)
4. Fourth embodiment (Example in which slave stations trigger start of operation of BSS COLOR)
5. Example of application 1. First Embodiment

[Example of Configuration Communication System]

Figure 1:
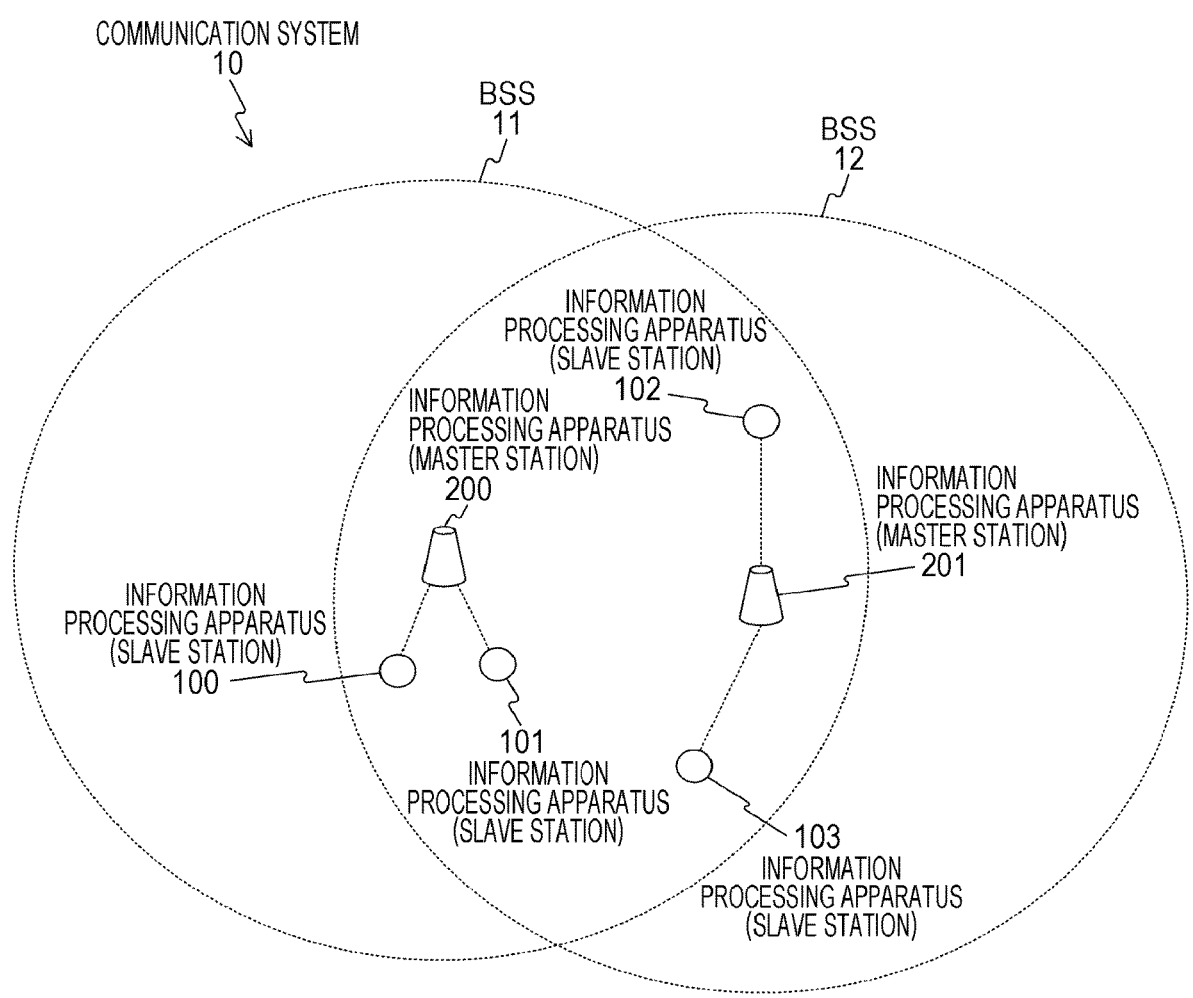
FIG. 1 is a diagram showing an example of a configuration of a system of a communication system 10 according to a first embodiment of the present technology.

FIG. 1 is a diagram showing an example of a configuration of a system of a communication system 10 according to a first embodiment of the present technology.

The communication system 10 includes information processing apparatuses (slave stations) 100 to 103 and information processing apparatuses (master station) 200, 201. Note that the notations of the slave station and the master station will be omitted as necessary in the following explanation. Incidentally, a wireless network (Basic Service Set (BSS)) including the information processing apparatus (master station) 200, information processing apparatuses (slave stations) 100, 101 will be schematically denoted as BSS11. On the other hand, a wireless network (BSS) including the information processing apparatus (master station) 201, information processing apparatuses (slave stations) 102, 103 will be schematically denoted as BSS12. More specifically, the wireless networks BSS11 and BSS12 are wireless networks located in proximity and having overlapping communication ranges.

The information processing apparatuses 100 to 103 are, for example, a portable information processing apparatus (wireless communication apparatus) having a wireless communication function. In this case, the portable information processing apparatus is an information processing apparatus such as a smartphone, a mobile phone, a tablet terminal, or the like. Further, it is assumed that the information processing apparatuses 100 to 103 have a communication function based on wireless LAN (Local Area Network) standard of IEEE (Institute of Electrical and Electronic Engineers) 802.11, for example. Examples of wireless LAN include Wireless Fidelity (Wi-Fi), Wi-Fi Direct, Wi-Fi CERTIFIED Miracast standard (technique specification title: Wi-Fi Display). Alternatively, wireless communications using other communication methods may also be performed.

Additionally, the information processing apparatuses 200, 201 are, for example, fixed type information processing apparatuses (wireless communication apparatuses) having a wireless communication function. In this case, the fixed type information processing apparatus is an information processing apparatus such as an access point, a base station, or the like. Additionally, like the information processing apparatuses 100 to 103, the information processing apparatuses 200 and 201 are assumed to have, for example, a communication function based on the wireless LAN standard of IEEE 802.11. Alternatively, wireless communications using other communication methods may also be performed.

In addition, the information processing apparatuses 200 and 201 function as master stations (master machines), and the information processing apparatuses 100 to 103 function as slave stations (slave machines). In addition, the information processing apparatuses 200 and 201 function as access points, and the information processing apparatuses 100 to 103 function as client apparatuses of the access points. More specifically, FIG. 1 shows an example in which there are two wireless master stations (information processing apparatuses 200, 201), and two wireless slave stations (information processing apparatuses 100 to 103) are connected to each device. It should be noted that the system configuration addressed in the embodiment of the present technology is not limited to the above. Incidentally, FIG. 1 shows an example of a communication system including two wireless master stations and four wireless slave stations, but the numbers of wireless master stations and wireless slave stations are not limited to the above. For example, the embodiment of the present technology can be applied to a communication system constituted by three or more wireless master stations (information processing apparatuses). Alternatively, for example, the embodiment of the present technology can also be applied to a communication system including 3 or 5 or more wireless slave stations (information processing apparatuses).

By the way, in a relationship between the two information processing apparatuses that perform communication, one of the two information processing apparatuses may be adopted as the master station and the other of the two information processing apparatuses may be adopted as the slave station. Alternatively, the connection between the two information processing apparatuses may be a direct communication connection between the slave stations.

In this case, IEEE 802.11 is a random access type wireless communication standard. In addition, in IEEE 802.11, when a plurality of master stations (master machines) and slave stations (slave machines) transmit asynchronously, which apparatus transmitted a received packet and whether or not the packet in question is transmitted to the apparatus in question can be determined by referring to information described in the Media Access Control (MAC) header. In addition, the credibility of the contents of the MAC header can be confirmed by Frame Check Sequence (FCS) attached to the end of the packet.

As described above, when making a determination by referring to the information described in the MAC header, each device cannot determine whether it is a packet to be received or not (i.e. whether it is a packet addressed to the apparatus in question) unless the packet is fully received to the end. In this case, the apparatus in question may waste unnecessary power for continuing reception processing of unnecessary packets from those other than the wireless network to which the apparatus in question belongs. In addition, when a packet addressed to the station in question that should originally be received arrives during reception processing of an unnecessary packet, the station may fail the reception.

Therefore, a technique has been proposed that performs packet filtering based on the identifier of the wireless network (BSS) and terminates unnecessary reception at an early stage (for example, see Non-Patent Document 1). More specifically, the identifier of the wireless network (BSS) is inserted in the PHY layer (physical layer) (in particular, the PLCP sublayer). Then, when the packet filtering is performed with that identifier, unnecessary reception can be terminated in the Physical Layer Convergence Protocol (PLCP) header. It should be noted that the PLCP sublayer transmits that should be interpreted commonly by various devices with different supported modulations, and therefore, it means a protocol for transmitting the header portion including the information with a modulation of a constant speed and thereafter transmitting PHY modulation dependent part. Incidentally, the PLCP layer BSS identifier is also referred to as BSS COLOR. More specifically, the BSS COLOR means the network identifier of the PHY PLCP layer. Additionally, Basic Service Set Identifier (BSSID) shall mean the network identifier of Media Access Control (MAC) layer of BSS (for example, star type MAC layer network). It should be noted that hereinafter, at least one of the BSS COLORs and pieces of information about this will be referred to as COLOR information as necessary. It should be noted that BSS COLOR is an example of a physical layer network identifier descried in claims. BSSID is an example of a data link layer network identifier described in claims.

As described above, the COLOR field in which the BSS COLOR is stored is finite. For this reason, the options for the possible values of BSS COLOR are limited. For example, in the case of Non-Patent Document 1, the COLOR field includes 3 bits, and there are only 8 possible choices. Additionally, the BSS COLOR is decided uniquely by the master station (access point). Therefore, BSS COLOR overlapping between BSSes (OBSSes) having overlapping communication ranges. It should be noted that OBSS means a BSS to which the apparatus in question does not belong. In this way, when the BSS COLORs overlay each other, it is impossible to properly filter the packet, and it may be impossible to terminate the packet at an early stage. Therefore, it is important to appropriately filter packets and terminate unnecessary reception appropriately.

Therefore, the embodiment according to the present technology shows an example where, when the master station detects overlapping of BSS COLOR, the master station decides the new BSS COLOR and notifying the slave station (client apparatus) of the new BSS COLOR and causes the update to be reflected. More specifically, an example is shown in which when the master station detects that the network identifier (BSS COLOR) included in the PLCP header overlaps between the BSSes, update setting and notification is given upon setting a predetermined transition time. Thereby, a mechanism for maintaining the improvement effect can be provided.

[Example of Configuration of Information Processing Apparatus (Master Station)]

Figure 2:
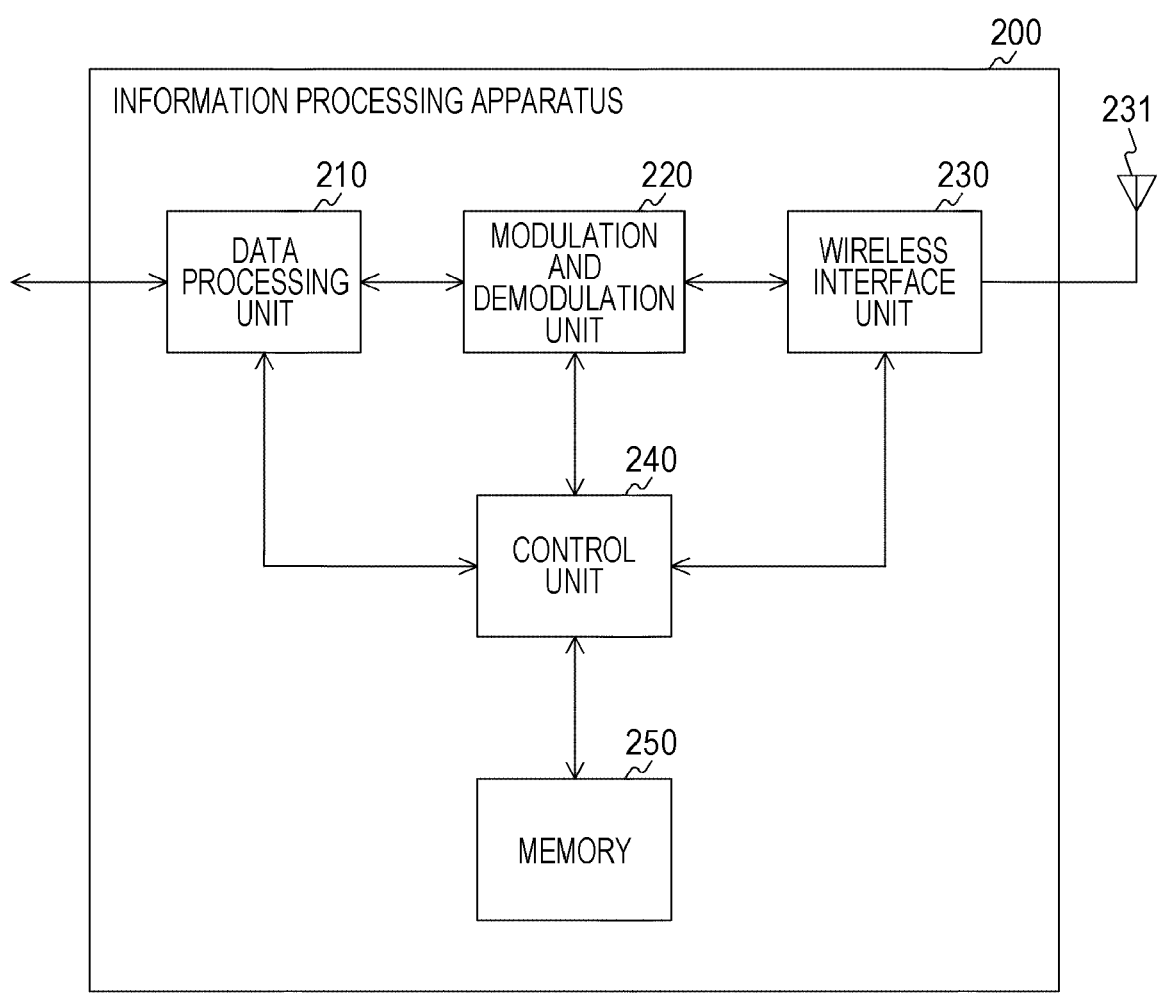
FIG. 2 is a block diagram showing an example of a configuration of functions of an information processing apparatus 200 according to the first embodiment of the present technology.

FIG. 2 is a block diagram showing an example of a configuration of functions of an information processing apparatus 200 according to the first embodiment of the present technology. It should be noted that the function configurations of the information processing apparatuses 100 to 103, 201 (the function configurations of the wireless communication) are substantially similar to those of the information processing apparatus 200, and therefore, the explanation thereabout will be omitted here.

The information processing apparatus 200 includes a data processing unit 210, a modulation and demodulation unit 220, a wireless interface unit 230, an antenna 231, a control unit 240, and a memory 250. It should be noted that FIG. 2 shows an example in which the information processing apparatus 200 includes a set of a wireless interface unit 230 and an antenna 231, but the information processing apparatus 200 may include two or more sets of wireless interface units and antennas.

The data processing unit 210 processes various data under the control of the control unit 240. For example, when data input from the upper layer is transmitted, the data processing unit 210 performs, on the basis of the data, processing for media access control (MAC) for a packet for wireless transmission. Each processing is, for example, processing such as addition of a header and addition of an error detection code. Then, the data processing unit 210 supplies the processed data to the modulation and demodulation unit 220. Incidentally, for example, in the case of reception in which there is an input from the modulation and demodulation unit 220, the data processing unit 210 performs MAC header analysis, packet error detection, reorder processing, and the like, and supplies the processed data to the protocol upper layer of the data processing unit 210.

The modulation and demodulation unit 220 performs modulation and demodulation processing and the like on the basis of the control of the control unit 240. At the time of transmission, for example, the modulation and demodulation unit 220 performs encoding, interleaving, modulation, and the like on input data given by the data processing unit 210 on the basis of the coding and modulation scheme that are set by the control unit 240, and generates a data symbol stream. Then, the modulation and demodulation unit 220 finally adds a Physical Layer Convergence Protocol (PLCP) header and provides it to the wireless interface unit 230. On the other hand, for example, at the time of reception, the modulation and demodulation unit 220 performs processing opposite to the transmission to process the encoded reception signal that is received from the wireless interface unit 230, and supplies the reception signal to the data processing unit 210 and the control unit 240.

The wireless interface unit 230 is an interface for connecting to various information processing apparatuses and transmitting and receiving various kinds of information. For example, at the time of transmission, the wireless interface unit 230 converts and amplifies the input from the modulation and demodulation unit 220 into an analog signal, performs filtering and frequency up-conversion on the signal, and sends the signal to the antenna 231. Then, for example, at the time of reception, the wireless interface unit 230 performs the opposite processing on the input from the antenna 231 and provides the processing result to the modulation and demodulation unit 220.

The control unit 240 controls the reception operation and the transmission operation of each of the data processing unit 210, the modulation and demodulation unit 220, and the wireless interface unit 230. For example, the control unit 240 exchanges information between the units, sets communication parameters, and schedules packets in the data processing unit 210. In addition, for example, the control unit 240 decides and reflects BSS COLOR.

In addition, for example, the control unit 240 compares the first physical layer network identifier (BSS COLOR) of the wireless network BSS11 to which the information processing apparatus 200 belongs and the second physical layer network identifier (BSS COLOR) of the wireless network BSS12 to which the information processing apparatus 200 does not belong, and determines whether the first physical layer network identifier (BSS COLOR) and the second physical layer network identifier (BSS COLOR) match each other. Incidentally, for example, when the control unit 240 determines that the first physical layer network identifier (BSS COLOR) and the second physical layer network identifier (BSS COLOR) match each other, the control unit 240 changes the first physical layer network identifier (BSS COLOR) and performs control to transmit change information relating the change to the slave station. For example, the control unit 240 can transmit the change information relating to the change to the slave station with a beacon frame (for example, COLOR update advance notification frame) shown in FIG. 9.

In addition, for example, when the control unit 240 changes the first physical layer network identifier (BSS COLOR), the control unit 240 performs control to change a condition (for example, a packet filtering condition) for terminating the reception processing of packets in the middle of reception.

The memory 250 has a function as a work area used in data processing performed by the control unit 240 and a function as a storage medium which holds various kinds of data. Examples of memories 250 include a storage medium such as a nonvolatile memory, a magnetic disk, an optical disk, a Magneto Optical (MO) disk, or the like. It should be noted that examples of nonvolatile memories include an Electrically Erasable Programmable Read-Only Memory (EEPROM) and an Erasable Programmable ROM (EPROM). Incidentally, for example, a hard disk, a disk type magnetic disk can be used as a magnetic disk.

Incidentally, for example, a Compact Disc (CD), a Digital Versatile Disc Recordable (DVD-R), and a Blu-Ray Disc (registered trademark) (BD) can be used as the optical disc.

In this case, the embodiment of the present technology shows an example in which each apparatus constituting the communication system 10 performs packet filtering on the basis of the BSS COLOR existing in the PLCP header used for packet transmission and reception. In this case, an example of a format of the PLCP header is shown in FIG. 3.

[Example of Format of PLCP Header]

FIG. 3 is a diagram showing an example of a format of a PLCP header exchanged between the apparatuses constituting the communication system 10 according to the first embodiment of the present technology. Incidentally, the first embodiment of the present technology shows an example in which BSS COLOR is stored in High Efficiency SIGNAL (HE-SIG)-A304, 308, 309.

a of FIG. 3 illustrates an example of a format of a PLCP header having HE-SIG-A304.

Legacy Short Training Field (L-STF) 301, Legacy Long Training Field (L-LTF) 302, High Efficiency Short Training Field (HE-STF) 305, and High Efficiency Long Training Field (HE-LTF) 306 shown in a of FIG. 3 are fields used for detection of a packet, timing synchronization, gain, frequency offset, estimation of propagation path gain.

In addition, Legacy SIGNAL (L-SIG) 303, High Efficiency SIGNAL (HE-SIG)-A304, HE-SIG-B307 shown in a of FIG. 3 are fields used for conveying information about modulation of data portion, a length of a frame, and the like.

In addition, b and c of FIG. 3 illustrate another example of a format of PLCP header having HE-SIG-A308, 309.

In addition, HE-SIG can store not only BSS COLOR but also other information. For example, HE-SIG can store information specifying the frequency, modulation, encoding method, length of the guard interval, presence or absence of multiplication of the weight, and the like to be used for the subsequent field in the transmission. In addition, for example, HE-SIG can store information specifying the frequency, modulation, encoding method, length of the guard interval, presence or absence of multiplication of the weight, and the like to be used for the response frame in reply to the frame.

d of FIG. 3 illustrates an example of a packet not having HE-SIG-A field for backwards compatibility.

As described above, BSS COLOR is decided by the master station. In addition, the master station attaches the decided BSS COLOR to the PLCP header in the transmission packet transmitted by the master station. Further, the master station uses the decided BSS COLOR for filtering of the reception packets.

In addition, the master station informs the slave station of the decided BSS COLOR. For example, the master station can incorporate the decided BSS COLOR into a beacon and transmit the beacon to the slave station for notification.

On the other hand, the slave station adds the BSS COLOR notified from the master station at the time of connection to the PLCP header in the transmission packet transmitted by the slave station. In addition, the slave station uses the notified BSS COLOR for filtering reception packets. An example of operation during reception in each information processing apparatus related to this filtering is shown in FIG. 4.

[Example of Operation of Packet Detection and Reception Determination Processing]

Figure 4:
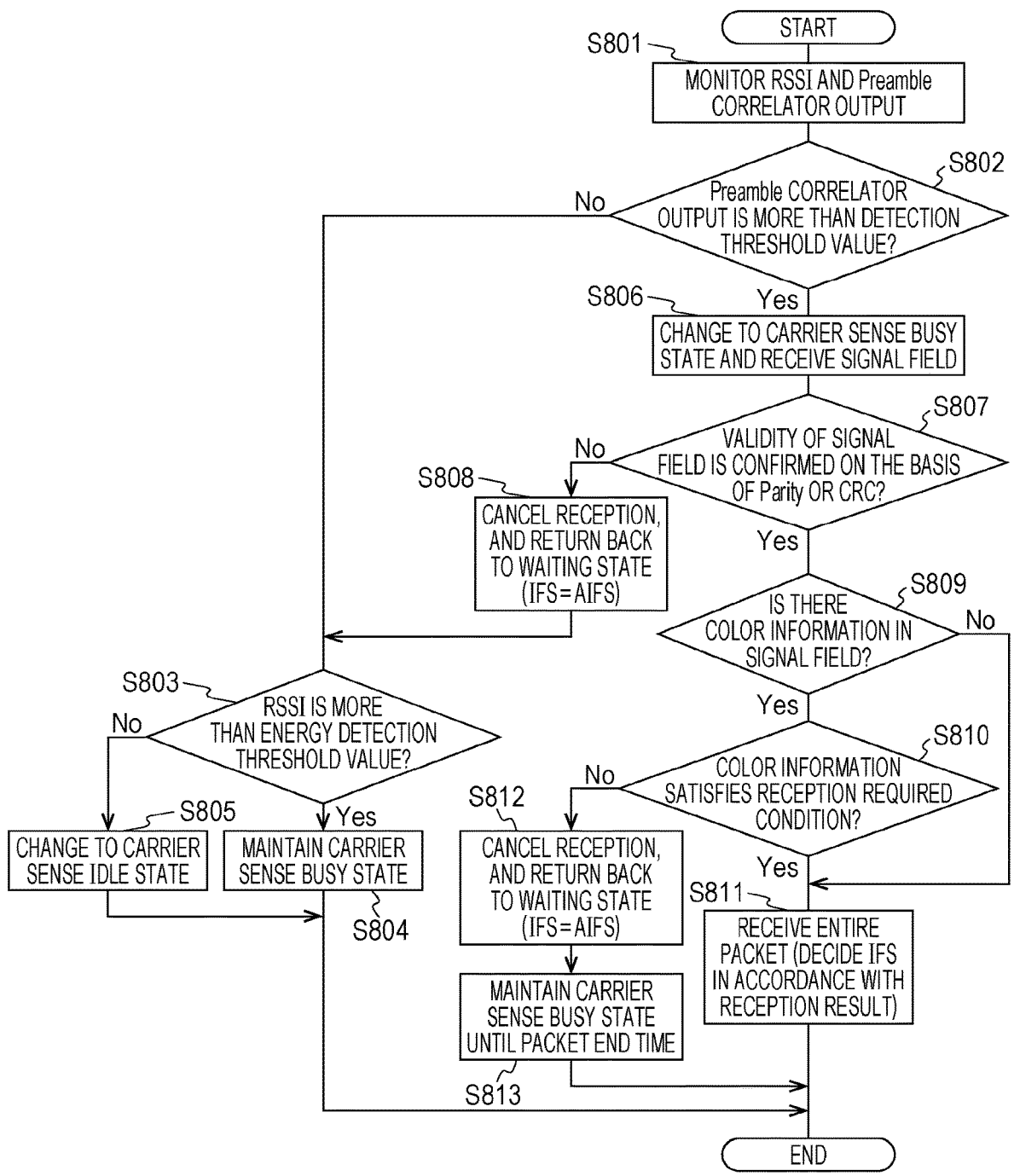
FIG. 4 is a flowchart showing an example of processing procedure of packet detection and reception determination processing performed by the information processing apparatus 200 according to the first embodiment of the present technology.

FIG. 4 is a flowchart showing an example of processing procedure of packet detection and reception determination processing performed by the information processing apparatus 200 according to the first embodiment of the present technology.

More specifically, FIG. 4 shows an example of processing procedure of packet detection and reception determination processing including filtering based on BSS COLOR. It should be noted that FIG. 4 shows only an example of operation of the information processing apparatus 200, but the other information processing apparatuses also perform the operation in a similar manner. For this reason, explanation about other information processing apparatuses will be omitted here.

First, the modulation and demodulation unit 220 of the information processing apparatus 200 measures the Received Signal Strength Indicator (RSSI) for the signal input via the antenna 231 and holds the RSSI obtained from the measurement (step S801). It should be noted that RSSI is the reception signal power strength. In addition, the modulation and demodulation unit 220 calculates the correlation of the preamble pattern and obtains the correlator output (preamble correlator output) (step S801). This correlator output means a correlation output strength COL (=RSSI×normalized correlator output). More specifically, the correlator output is not the normalized correlator output level but is the correlator output converted by reflecting the reception power.

In this manner, each of the master station and the slave station monitors RSSI measurement and preamble correlator output for the signal input from the antenna while in the standby state (step S801).

The preamble correlator output to be monitored is compared with the detection threshold value (step S802). In this case, the detection threshold value is a detection threshold value for reading the SINGAL field prior to the main determination processing. For example, as a detection threshold value, the IEEE 802.11 standard refers to a value of −82 dBm per 20 MHz bandwidth as a guideline value. Alternatively, a value other than −82 dBm may be used as the detection threshold value.

When the value of the preamble correlator output is equal to or less than the detection threshold value (step S802), the control unit 240 compares the measured RSSI with an energy detection threshold value ED (step S803). Then, the control unit 240 determines whether the RSSI is more than the energy detection threshold value ED (step S803). In this case, the energy detection threshold value ED can be, for example, −62 dBm per 20 MHz bandwidth.

In the case where the RSSI is more than the energy detection threshold value ED (step S803), the control unit 240 maintains a carrier sense BUSY state (step S804), and terminates the operation of the packet detection and reception determination processing. On the other hand, in the case where the RSSI is equal to or less than the energy detection threshold value ED (step S803), the control unit 240 shifts to the carrier sense IDLE state (step S805) and terminates the operation of the packet detection and reception determination processing.

On the other hand, in the case where the value of the preamble correlator output is more than the detection threshold value (step S802), the control unit 240 changes into the carrier sense BUSY state and receives the SIGNAL field (HE-SIG-A field in the PLCP header) (step S806).

Subsequently, the control unit 240 determines whether the validity of the received SIGNAL field can be confirmed on the basis of the parity or Cyclic Redundancy Check (CRC) (step S807). In the case where the validity of the received SIGNAL field cannot be confirmed (step S807), the control unit 240 cancels the reception of that packet and returns back to the standby state (step S808). Further, the control unit 240 sets the inter frame space (IFS), which is a period of time the control unit 240 waits before attempting to perform a subsequent transmission, to an Arbitration IFS (AIFS).

In the case where the validity of the received SIGNAL field can be confirmed (step S807), the control unit 240 determines whether BSS COLOR information exists in the SIGNAL field (step S809). In this case, a packet having BSS COLOR information in the SIGNAL field is considered to mean a packet having BSS COLOR field in HE-SIG-A field of which value is not a wildcard COLOR value. In this case, the wildcard COLOR value is assumed to be a value that means forcing the reception. On the other hand, a packet having no BSS COLOR information in the SIGNAL field means a packet not having BSS COLOR in HE-SIG-A field, a packet having BSS COLOR information in the SIGNAL field but having wildcard COLOR value as its value, or a packet not having HE-SIG-A field for backwards compatibility. It should be noted that a packet not having HE-SIG-A field for backwards compatibility is, for example, a packet shown in d of FIG. 3.

In the case where BSS COLOR information does not exist in the SIGNAL field (step S809), step S811 is subsequently performed.

In the case where BSS COLOR information exists in the SIGNAL field (step S809), a determination is made as to whether the BSS COLOR satisfies the reception required condition or not (step S810). In this case, the required reception condition means that the BSS COLOR existing in the SIGNAL field (within the HE-SIG-A field in the PLCP header) matches the COLOR used by the BSS in question. It should be noted that the BSS in question means a BSS to which the apparatus in question belongs.

In the case where the BSS COLOR satisfies the reception required condition (step S810), the control unit 240 continues the reception processing of the entire packet including the SIGNAL field (step S811). In this case, the control unit 240 decides the inter frame space (IFS) before the subsequent transmission attempt according to the reception result.

In the case where the BSS COLOR does not satisfy the reception required condition (step S810), the control unit 240 can abort (cancel) the reception processing of the packet including the SIGNAL field upon having performed the reception processing of the SIGNAL portion and return back to the standby state (step S812). However, the carrier sense state is treated as BUSY until the end time of the packet (step S813). In addition, the inter frame space (IFS) before the next transmission attempt is adopted as an AIFS.

In this case, for example, two BSSes in proximity to each other (for example, BSS11 and BSS12 shown in FIG. 1) are considered to be using the same COLOR. In this case, the master station and the slave station included in the areas of the BSSes are within the range of radio waves from the OBSS side. Therefore, the master station and the slave station included in the areas of the BSSes cannot cancel the reception of a packet because the required reception condition is satisfied even if it is a received packet that is not needed to be received.

Further, in the case where a packet having no BSS COLOR information in the HE-SIG-A field is received, the reception of that packet cannot be cancelled. In addition, even in the case where a packet as shown in d of FIG. 3 (i.e., a packet having no HE-SIG-A field with backwards compatibility) is received, the reception of that packet cannot be canceled.

Therefore, in the embodiment of the present technology, when overlapping (matching) of OBSS COLOR with OBSS is detected, a new COLOR is decided and reflected in each information processing apparatus.

[Communication Example]

Figure 5:
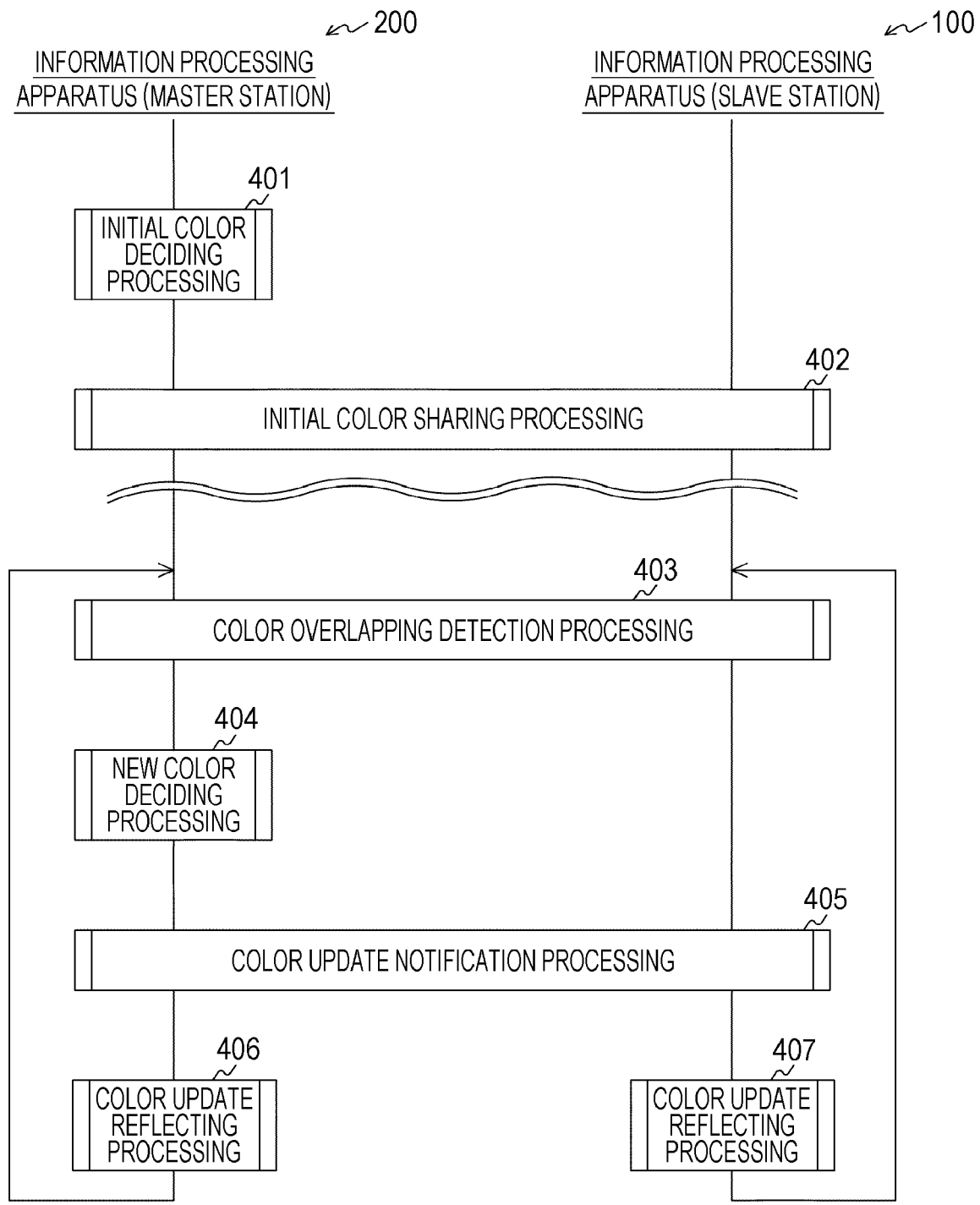
FIG. 5 is a sequence chart showing an example of communication processing between apparatuses constituting the communication system 10 according to the first embodiment of the present technology.

FIG. 5 is a sequence chart showing an example of communication processing between apparatuses constituting the communication system 10 according to the first embodiment of the present technology.

In the first embodiment of the present technology, as shown in FIG. 5, each processing performed between the information processing apparatus 100 and the information processing apparatus 200 will be described in six phases. More specifically, each processing performed between the information processing apparatus 100 and the information processing apparatus 200 will be described in six phases including initial COLOR deciding processing, initial COLOR sharing processing, COLOR overlapping detection processing, new COLOR deciding processing, COLOR update notification processing, and COLOR update reflecting processing. In addition, the transmission and reception processing other than the above is equivalent to processing based on standard-compliant generally-available Carrier Sense Multiple Access with Collision Avoidance (CSMA/CA) except that there is filtering processing based on COLOR.

It should be noted that although only the relationship between the information processing apparatus 200 and the information processing apparatus 100 is shown in FIG. 5 as the relationship between the master station and the slave station, the relationships between the other information processing apparatuses are also similar thereto.

First, the information processing apparatus 200 performs the initial COLOR deciding processing (401).

Subsequently, initial COLOR sharing processing is performed between the information processing apparatus 200 and the information processing apparatus 100 (402).

Subsequently, COLOR overlapping detection processing is performed between the information processing apparatus 200 and the information processing apparatus 100 (403). This COLOR overlapping detection processing will be explained in detail with reference to FIG. 7. In this case, in the embodiment of the present technology, a case where the BSS COLORs to be compared match each other will be described as a detection of overlapping of BSS COLORs. Further, the first and third embodiments of the present technology show an example in which the master station detects overlapping of BSS COLORs.

Further, the second and fourth embodiments of the present technology show an example in which the slave station detects overlapping of BSS COLOR.

Subsequently, the information processing apparatus 200 performs new COLOR deciding processing (404). This new COLOR deciding processing will be explained in details with reference to FIG. 10.

Subsequently, COLOR update notification processing is performed between the information processing apparatus 100 and the information processing apparatus 200 (405).

Subsequently, each of the information processing apparatus 200 and the information processing apparatus 100 performs COLOR update reflecting processing (406, 407). This COLOR update reflecting processing will be explained in details with reference to FIG. 12.

It should be noted that, in the following explanation, the information processing apparatus 200 will be mainly used as an example of the master station in the explanation, the information processing apparatus 100 will be mainly used as an example of the slave station in the explanation.

[Example of Initial COLOR Deciding Processing]

The initial COLOR deciding processing is processing which decides the BSS COLOR used in the initial state when master station starts COLOR operation.

Initially, the control unit 240 of the information processing apparatus 200 monitors the beacon from the surrounding OBSS in the frequency channel in which the control unit 240 is going to operate. Subsequently, the control unit 240 of the information processing apparatus 200 extracts the BSS COLOR that is already used in the OBSS, which is notified by each beacon from the detected OBSS. Subsequently, the control unit 240 of the information processing apparatus 200 randomly selects and decodes the BSS COLOR value from the choices other than the extracted BSS COLOR. On the other hand, in the case where the wildcard COLOR value is defined, the control unit 240 of the information processing apparatus 200 makes a decision while also excluding this COLOR value from the choices.

In this case, the targets to be monitored may not be necessarily only the beacon frames. For example, frames of other frame types including the COLOR information in the PLCP header may also be adopted as the target of monitor, and the information about the COLOR in the PLCP header may be extracted as the COLOR information already used in the OBSS.

This initial COLOR deciding processing may be performed as soon as the BSS is opened, or the initial COLOR deciding processing may be performed while making a connection with the slave station after opening the BSS.

[Example of Format of COLOR Information Shared Frame]

Figure 6:
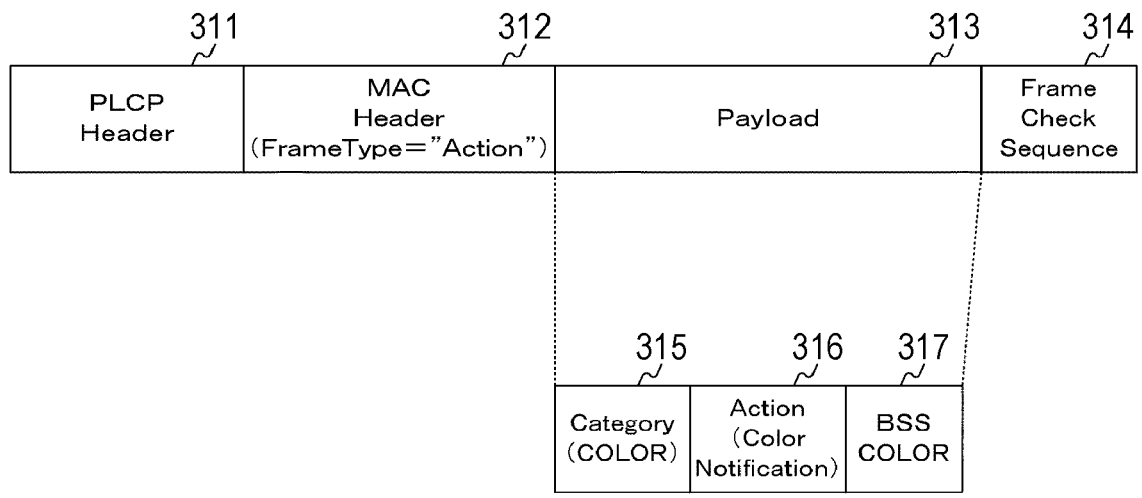
FIG. 6 is a diagram showing an example of a format of COLOR information shared frame exchanged between the apparatuses constituting the communication system 10 according to the first embodiment of the present technology.

FIG. 6 is a diagram showing an example of a format of COLOR information shared frame exchanged between the apparatuses constituting the communication system 10 according to the first embodiment of the present technology.

The COLOR information shared frame includes a PLCP Header 311, a MAC Header 312, a Payload 313, and a Frame Check Sequence (FCS) 314.

The Payload 313 includes a Category 315, an Action 316, and a BSS COLOR 317.

The Category 315 stores information indicating that it is a COLOR information shared frame.

The Action 316 stores information indicating that it is a notification for sharing COLOR information (BSS COLOR)

The BSS COLOR 317 stores initial COLOR information (BSS COLOR) decided in the initial COLOR deciding processing.

[Example of Operation of Initial COLOR Sharing Processing]

The initial COLOR sharing processing is processing for sharing the initial COLOR information (BSS COLOR) decided by the master station with the slave station.

The information processing apparatus 200 transmits initial COLOR information (BSS COLOR) decided in the initial COLOR deciding processing to the slave station. For example, the information processing apparatus 200 transmits initial COLOR information (BSS COLOR) included in any of bacon, Probe Response, Association Response frame, dedicated COLOR information shared frame (shown in FIG. 6).

In this case, the initial COLOR sharing processing may be included in a series of procedures in which the slave station connects to the master station, i.e., (Scan, Authentication, Association, and then 4-way Handshake). Further, the initial COLOR sharing processing may be performed by transmitting the COLOR information shared frame from the master station to the slave station after connection establishment.

Further, the slave station obtains the COLOR information (BSS COLOR) transmitted from the master station. For example, the slave station obtains the BSS COLOR used in the BSS from the contents of beacon, Probe Response, Association Response frame, and COLOR information shared frame. In this way, the slave station that has obtained the BSS COLOR appends the BSS COLOR that the slave station had gotten to the PLCP header in the transmission packet of the apparatus in question. Further, the slave station that has obtained the BSS COLOR uses the BSS COLOR that the slave station had gotten for the filtering during packet reception.

[Example of Operation of COLOR Overlapping Detection Processing]

Figure 7:
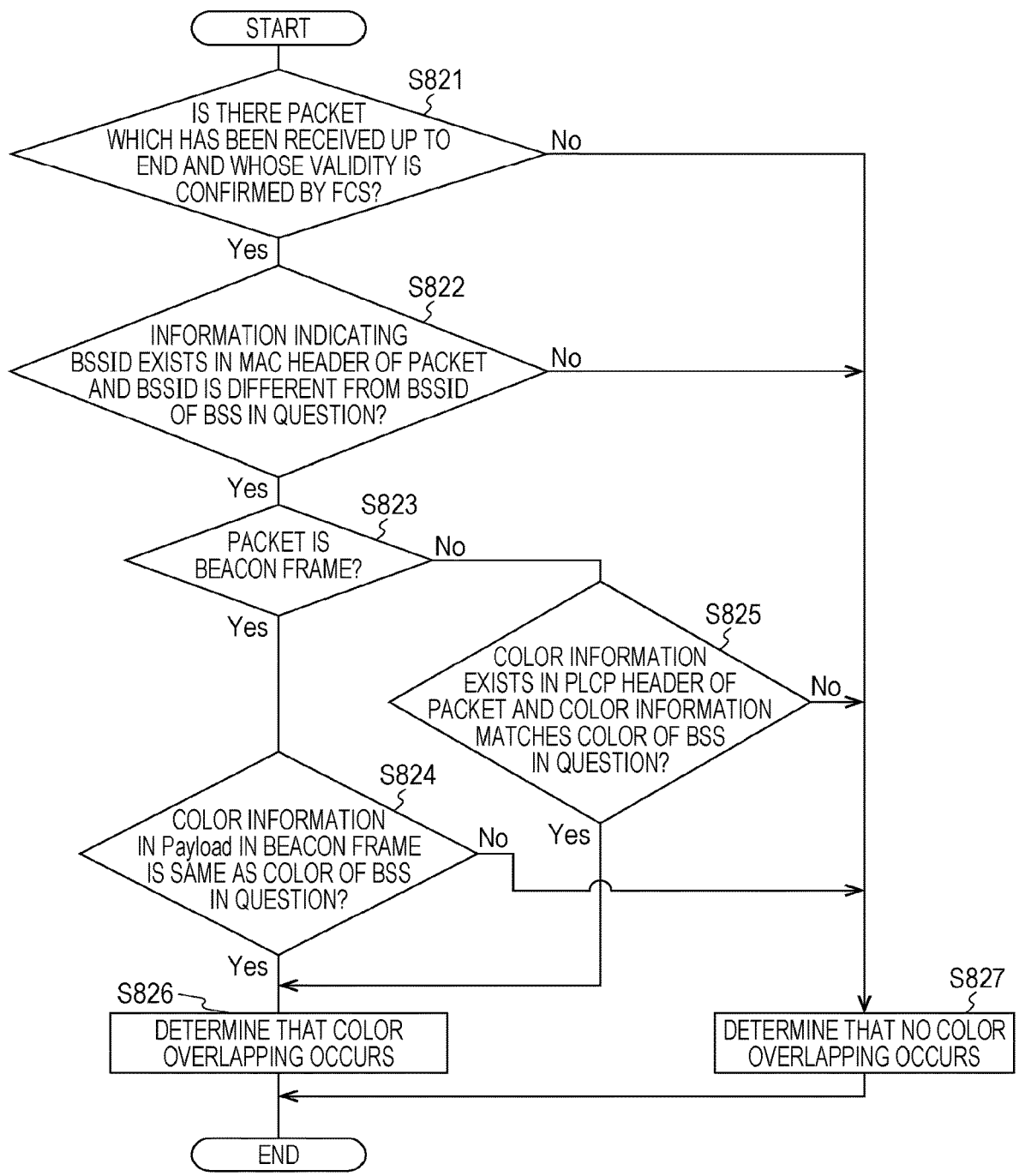
FIG. 7 is a flowchart showing an example of processing procedure of COLOR overlapping detection processing performed by the information processing apparatus 200 according to the first embodiment of the present technology.

FIG. 7 is a flowchart showing an example of processing procedure of COLOR overlapping detection processing performed by the information processing apparatus 200 according to the first embodiment of the present technology.

First, the control unit 240 of the information processing apparatus 200 determines whether there is a packet which has been received up to the end of the received packet and whose validity is confirmed by the FCS (step S821). Then, in the case where there is no packet for which the validity of the content is confirmed (step S821), the control unit 240 determines that the packet is not COLOR overlapping (step S827).

In the case where there is a packet for which the validity of the content is confirmed (step S821), the control unit 240 determines whether information indicating the BSSID exists in the MAC header of the packet and whether the BSSID is different from the BSSID of the BSS in question (step S822).

In the case where there is no information indicating the BSSID in the MAC header, or if the BSSID is the same as the BSSID of the BSS in question (step S822), step S827 is subsequently performed.

When the information indicating the BSSID exists in the MAC header and the BSSID is different from the BSSID of the BSS in question (step S822), the control unit 240 determines whether the packet is a beacon frame or not (step S823).

In the case where the packet is a beacon frame (step S823), the control unit 240 determines whether the COLOR information in the payload in the beacon frame is the same as the COLOR of the BSS in question (step S824).

In the case where the packet is not a beacon frame (step S823), the control unit 240 determines whether COLOR information exists in the PLCP header of the packet and whether the COLOR information matches the COLOR of the BSS in question (step S825).

In the case where COLOR information exists in the PLCP header of the packet and the COLOR information matches the COLOR of the BSS in question (step S825), step S826 is subsequently performed. On the other hand, in the case where there is no COLOR information in the PLCP header of the packet, or in the case where the COLOR information does not match the COLOR of the BSS in question (step S825), step S827 is subsequently performed.

As described above, in the COLOR overlapping detection processing, COLOR overlapping can be determined using two detection conditions. More specifically, in the case where the value of the BSS COLOR existing in the physical header of the received packet is the same as the value of the BSS COLOR used in the BSS in question, and the value of the BSSID existing in the MAC header and the value of the BSSID of the BSS in question are different from each other, the BSS COLOR of the BSS in question can be determined to match the BSS COLOR of the OBSS. Further, in the case where information about the BSS COLOR described in the payload of the received beacon packet is the same as the information about the BSS COLOR used in the BSS in question, and the information about the BSSID existing in the MAC header is different from the information about the BSSID of the BSS in question, the BSS COLOR of the BSS in question can be determined to match the BSS COLOR of the OBSS.

Further, when a packet having no BSSID or COLOR field is received, the packet can be excluded from detection.

It should be noted that regardless of the presence or absence of overlapping detection, the information processing apparatus 200 may notify the devices around the information processing apparatus 200 of information about the COLOR used in the surroundings of the information processing apparatus 200 obtained in the COLOR overlapping detection processing. At this occasion, not only the COLOR information but also the BSSID used in the BSS corresponding to the COLOR and the RSSI at which the frame carrying the COLOR information is received may also be notified. In that case, in the case where multiple COLORs used around the information processing apparatus 200 are detected, each of the multiple COLORs may be notified.

The method of notification may be not only a notification of a unicast designating a destination, or may be in a form of notification in which broadcast or multicast is designated as a destination. Further, an example of a format of a COLOR monitor result notification frame is shown in FIG. 8.

[Example of Format of COLOR Monitor Result Notification Frame]

Figure 8:
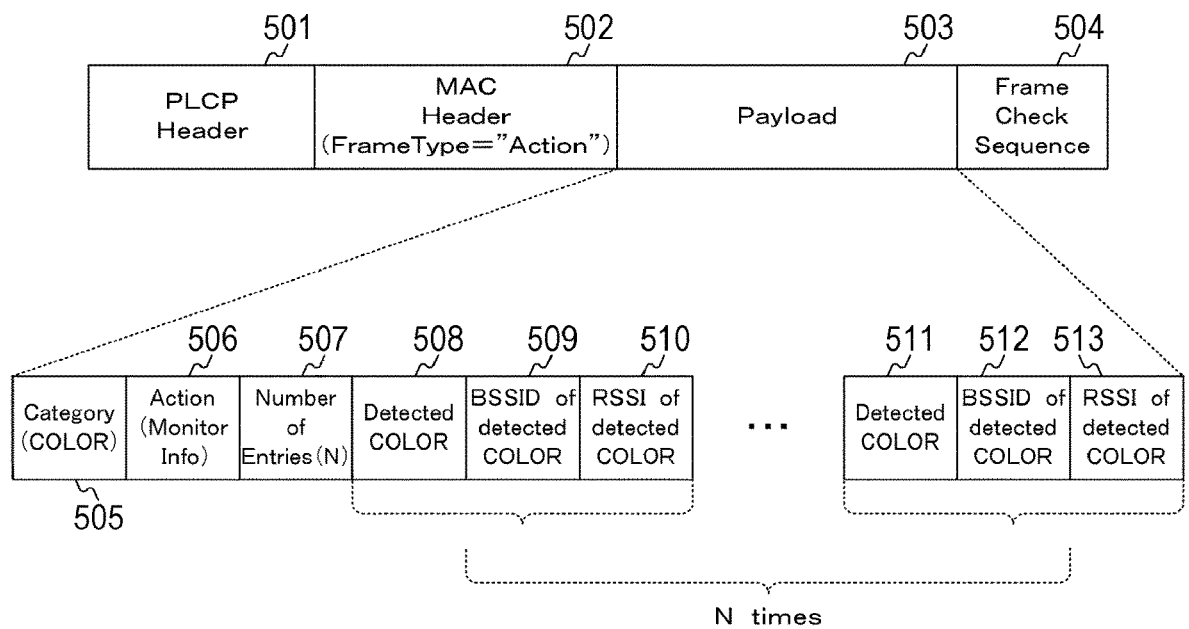
FIG. 8 is a diagram showing a format example of a COLOR monitor result notification frame exchanged between the apparatuses constituting the communication system 10 according to the first embodiment of the present technology.

FIG. 8 is a diagram showing a format example of a COLOR monitor result notification frame exchanged between the apparatuses constituting the communication system 10 according to the first embodiment of the present technology.

The COLOR monitor result notification frame includes a PLCP Header 501, a MAC Header 502, a Payload 503, and a Frame Check Sequence (FCS) 504.

The Payload 503 includes a Category 505, an Action 506, a Number of Entries 507, Detected COLORs 508, 511, BSSIDs of detected COLORs 509, 512, and RSSIs of detected COLORs 510, 513.

The Category 505 stores information indicating that it is a COLOR monitor result notification frame.

The Action 506 stores information indicating that it is a notification of a COLOR monitor result.

The Number of Entries 507 stores a number of combinations N of pieces of information stored in the COLOR monitor result notification frame. More specifically, the Number of Entries 507 stores the number of combinations N of the Detected COLORs, the BSSIDs of detected COLORs, and the RSSIs of detected COLORs.

The Detected COLORs 508, 511 stores information about the BSS COLORs used around the station in question.

The BSSIDs of detected COLORs 509, 512 store BSSIDs of networks transmitting BSS COLORs used around the station in question.

The RSSIs of detected COLORs 510, 513 store RSSIs of packets from OBSSes of BSS COLORS used around the station in question.

Further, in order to always receive the COLOR monitor result notification frame, the PLCP Header 501 does not store the COLOR information (BSS COLOR) about the BSS in question.

Figure 10:
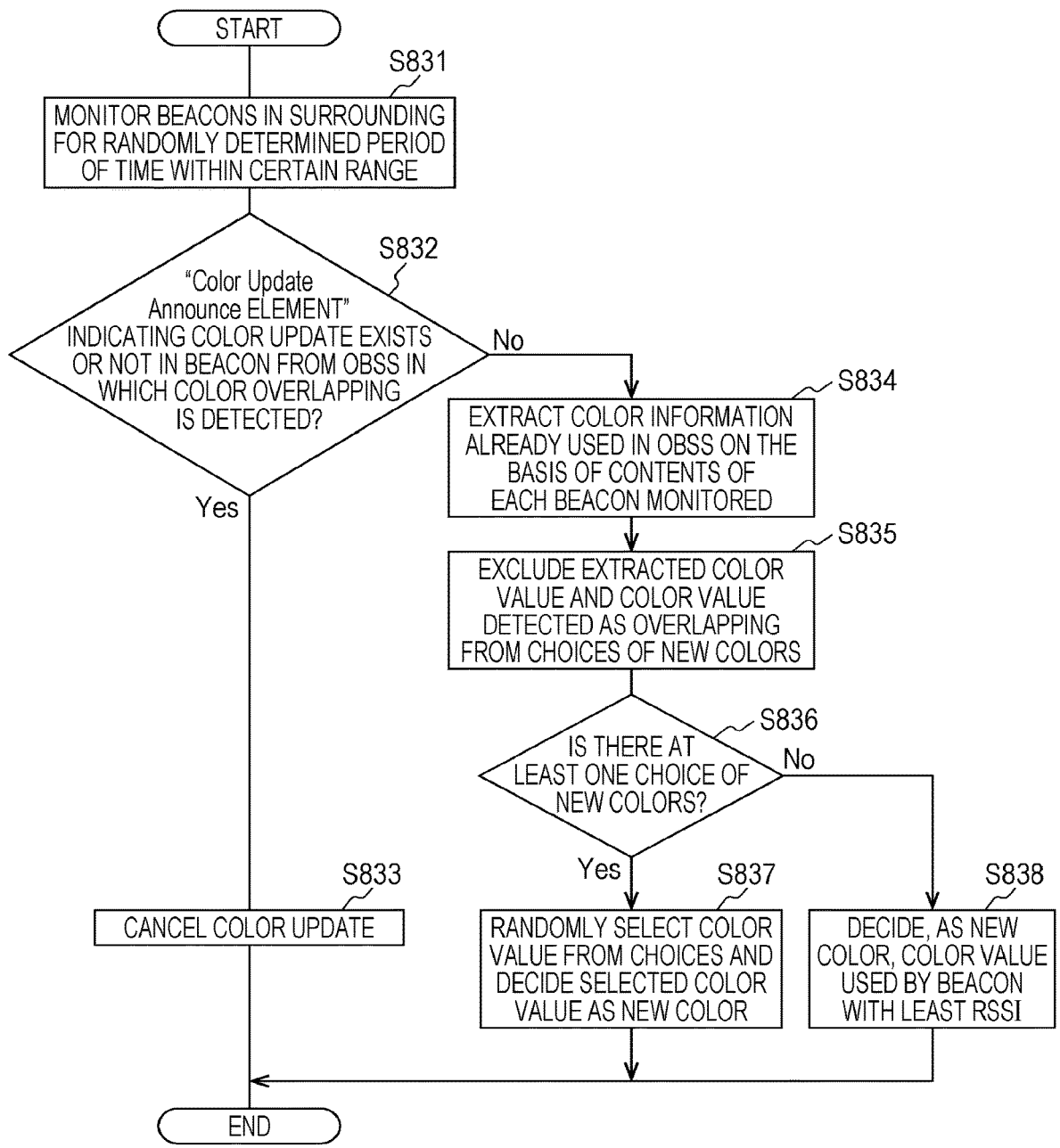
FIG. 10 is a flowchart showing an example of processing procedure of new COLOR deciding processing performed by the information processing apparatus 200 according to the first embodiment of the present technology.

Further, in the case where COLOR overlapping is detected in the COLOR overlapping detection processing, the information processing apparatus 200 decides a new BSS COLOR. In the following description, for sake of ease of explanation, a BSS COLOR in which overlapping is detected will be referred to as an old COLOR, and a BSS COLOR newly decided after detection of overlapping will be referred to as a new COLOR. Further, an example of operation of new COLOR deciding processing for deciding a new COLOR is shown in FIG. 10.

[Example of Format of Beacon Frame]

Figure 9:
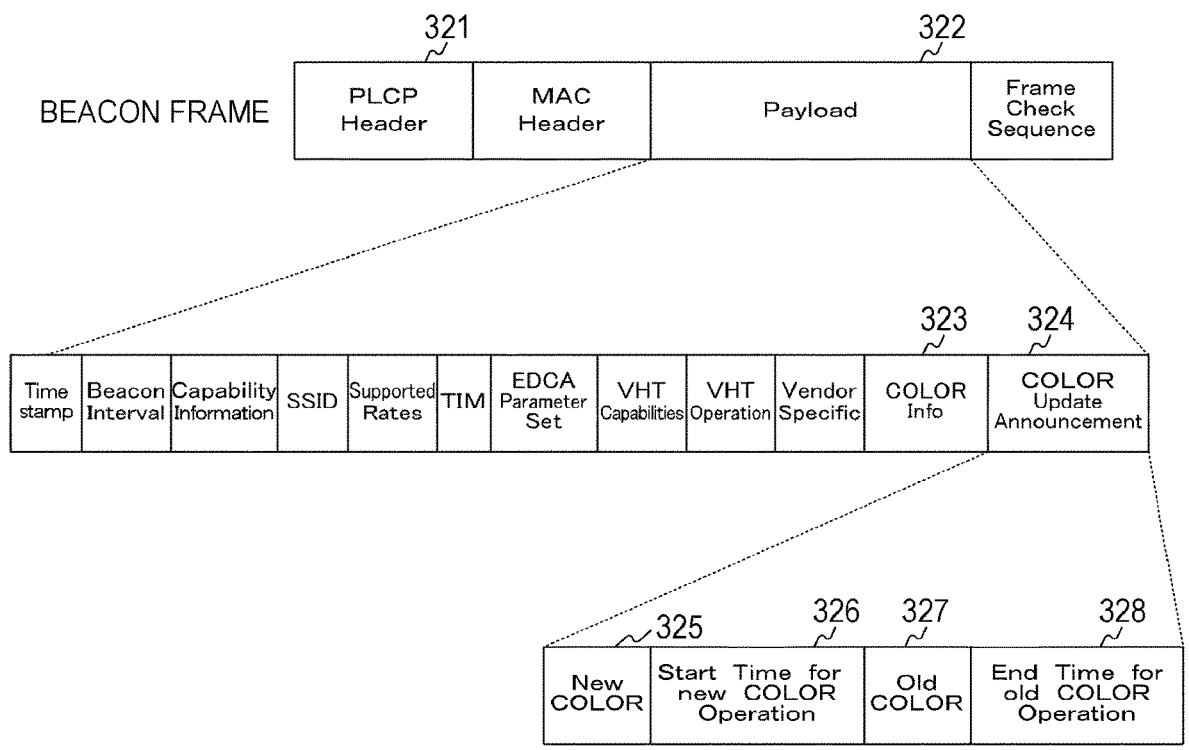
FIG. 9 is a diagram showing an example of a format of a beacon frame exchanged between the apparatuses constituting the communication system 10 according to the first embodiment of the present technology.

FIG. 9 is a diagram showing an example of a format of a beacon frame exchanged between the apparatuses constituting the communication system 10 according to the first embodiment of the present technology.

In the first embodiment of the present technology, the COLOR info 323 of the Payload 322 in the beacon frame stores the COLOR information (BSS COLOR) about the BSS in question. It should be noted that the COLOR info 323 is a field that is provided at all times.

In addition, in the first embodiment of the present technology, in order to cause the slave station to always receive the beacon frame, the PLCP Header 321 in the beacon frame does not store the COLOR information (BSS COLOR) of the BSS in question.

In addition, as described above, in the case where COLOR overlapping is detected in the COLOR overlapping detection processing, a new COLOR is decided. For this reason, it is necessary to notify the slave station of the decided new COLOR. Therefore, in the first embodiment of the present technology, a field (COLOR Update Announcement 324) for notifying the slave station of the decided new COLOR is provided in the Payload 322 during an update transition period. More specifically, the COLOR Update Announcement 324 is an element to be added (COLOR Update Announce element) only when a COLOR change occurs.

The New COLOR 325 of the COLOR Update Announcement 324 stores a new COLOR decided in the new COLOR deciding processing.

The Start Time for new COLOR Operation 326 of the COLOR Update Announcement 324 stores an application start time of the new COLOR decided in the new COLOR deciding processing. It should be noted that the Start Time for new COLOR Operation 326 may be omitted. In this case, the slave station can recognize the time when the beacon frame containing the COLOR Update Announcement 324 is received as the application start time of the new COLOR decided in the new COLOR deciding processing.

The Old COLOR 327 of the COLOR Update Announcement 324 stores old COLOR in which COLOR overlapping is detected in the COLOR overlapping detection processing. It should be noted that the same information as the COLOR info 323 is stored in the Old COLOR 327. Therefore, if the slave station can refer to the COLOR info 323, the Old COLOR 327 may be omitted.

The End Time for old COLOR Operation 328 of the COLOR Update Announcement 324 stores the application end time of the old COLOR in which COLOR overlapping is detected in the COLOR overlapping detection processing.

In this case, there may be a slave station in the Power Save state. Therefore, it is preferable to set the old COLOR application end time so that the slave station that is in the Power Save state can also receive a new COLOR. For example, in the case where there is a slave station in the Power Save state, a time after at least the Delivery Traffic Indication Message (DTIM) interval or more since the time at which the COLOR change occurred can be set as an "old COLOR application end time".

Further, the COLOR Update Announce element is preferably notified at least from the time when the COLOR change occurred to the old COLOR application end time. More specifically, at least from the time at which COLOR change occurred to the old COLOR application end time, the beacon transmitted from the information processing apparatus 200 is provided with a COLOR Update Announcement 324.

As described above, the beacon frame shown in FIG. 9 can be understood as an update advance notification frame (change information) of the BSS COLOR. Further, in order to improve the chance that the slave station can successfully perform reception, the update advance notification frame is transmitted multiple times at least from the time when the COLOR change occurred to the old COLOR application end time. Further, in the update advance notification frame, each of the new COLOR application start time and the old COLOR application end time are designated with an absolute time.

In this case, depending on the slave station, the beacon's reception situation and the like may be different depending on the slave stations, and accordingly, application timing of a new COLOR may be different. Therefore, unless, for example, an overlap period for the new COLOR and the old COLOR is set, incorrect packet filtering may be performed and an error may occur. Therefore, in the first embodiment of the present technology, the times of the new COLOR and the old COLOR are separately defined and are allowed to overlap each other.

As described above, the COLOR info 323 is a field that is provided at all times, whereas the COLOR Update Announcement 324 is a field provided only during the update transition period.

As described above, the control unit 240 of the information processing apparatus 200 incorporates designation information for designating the start timing to start using the new COLOR and the end timing to end the use of the old COLOR into change information (beacon frame), and transmits the change information (beacon frame). In addition, in the case where there is a slave station that is in the Power Save state in the BSS in question, the control unit 240 can set a time longer than the DTIM interval as the time from the start timing to the end timing.

[Example of Operation of New COLOR Deciding Processing]

FIG. 10 is a flowchart showing an example of processing procedure of new COLOR deciding processing performed by the information processing apparatus 200 according to the first embodiment of the present technology.

First, the control unit 240 of the information processing apparatus 200 monitors beacons in the surrounding (a beacon from OBSS (including BSS other than the BSS in which overlapping detection is made)) (step S831). In this case, when overlapping is detected, new COLOR deciding processing may also be performed and a BSS COLOR may be updated in the BSS in which overlapping is detected. Therefore, in order to avoid updating at the same time as the BSS in which overlapping is detected, the time length for monitoring the surrounding beacons is preferably a randomly determined period of time within a certain range.

In this case, the target to be monitored may not necessarily be just the beacon frame. For example, frames of other frame types including COLOR information in the PLCP header may also be monitored, and information about the COLOR in the PLCP header may be extracted as the COLOR information already used by the OBSS.

Subsequently, the control unit 240 determines whether a COLOR update announcement area (COLOR Update Announcement 324 (shown in FIG. 9)) exists or not in the beacon from the OBSS in which COLOR overlapping is detected (step S832).

In the case where the COLOR change announcement area exists (step S832), this means that the OBSS in which COLOR overlapping is detected updates the BSS COLOR. Therefore, COLOR overlapping will be resolved without updating the COLOR of the BSS to which the information processing apparatus 200 belongs. Therefore, in the case where the element exists (step S832), the control unit 240 stops the COLOR update (step S833)

In the case where the element does not exist (step S832), the control unit 240 extracts the COLOR information (BSS COLOR) already used in the OBSS on the basis of the contents of each beacon from the OBSS received during the monitoring (step S834).

Subsequently, the control unit 240 excludes the extracted COLOR value (BSS COLOR) and the COLOR value detected as overlapping (BSS COLOR) from the choices of new COLORs (step S835). In this case, each beacon from the OBSS received during monitoring may be notifying not only the used COLOR information (BSS COLOR) but also "COLOR Update Announce element" indicating COLOR change notification. In this case, the control unit 240 also extracts, as COLOR information already used in the OBSS, the BSS COLOR to which the BSS COLOR is to be changed and which is identified by the COLOR change notification, and excludes the BSS COLOR from the choices of new COLORs. Further, in the case where a wildcard COLOR value is defined, the control unit 240 of the information processing apparatus 200 makes decision upon also excluding this COLOR value from the choices.

Subsequently, the control unit 240 determines whether there are at least one or more choices of new COLOR (step S836). In the case where there are one or more choices of new COLORs (step S836), the control unit 240 randomly selects COLOR value from the choices and decides the selected COLOR value as new COLOR (step S837).

In this case, as a result of excluding the BSS COLOR used by the OBSS on the basis of the monitor result, there may not be any choice. As described above, in the case where there is not any choice of new COLOR (step S836), the control unit 240 decides, as the new COLOR, the COLOR value used by a beacon of which reception strength (reception signal strength) is the smallest among the monitored beacons (step S838). It should be noted that reception strength is, for example, RSSI.

As described above, the control unit 240 extracts the BSS COLOR used in the OBSS on the basis of the notification information (beacon) transmitted from the OBSS. In this case, the control unit 240 can randomly set the monitoring time of the notification information (beacon) for extracting the BSS COLOR used in the OBSS. Then, the control unit 240 decides the BSS COLOR other than the extracted BSS COLOR as the new BSS COLOR.

On the other hand, in the case where there is no BSS COLOR other than the extracted BSS COLOR, the control unit 240 can adopt, as the new BSS COLOR, the BSS COLOR used in an OBSS that transmits the notification information (beacon) with the smallest reception strength.

Further, even when BSS COLOR overlaps, the control unit 240 does not change the BSS COLOR when the notification information (beacon) transmitted from OBSS includes change information to change the BSS COLOR It should be noted that the monitor of the surrounding beacon mentioned above may be started after overlapping is detected, or the monitor of the surrounding beacon mentioned above may performed at all times (or with a regular interval) in the background.

[Example of COLOR Update Notification Processing]

In the case where a new COLOR is decided in the new COLOR deciding processing, the information processing apparatus 200 performs COLOR update notification processing to notify the slave station of the decided new COLOR.

For example, the information processing apparatus 200 can notify the slave station of the decided new COLOR with a beacon (beacon frame shown in, for example, FIG. 9).

Further, for example, the information processing apparatus 200 may individually notify the slave station of the declined new COLOR with a Management frame or a Broadcast data frame.

[Example of COLOR Update Reflecting Processing]

Each information processing apparatus (the master station and the slave station) constituting the communication system 10 performs COLOR update reflecting processing to reflect the change to new COLOR. This COLOR update reflecting processing is done in both of the master station and the slave station.

Figure 11:
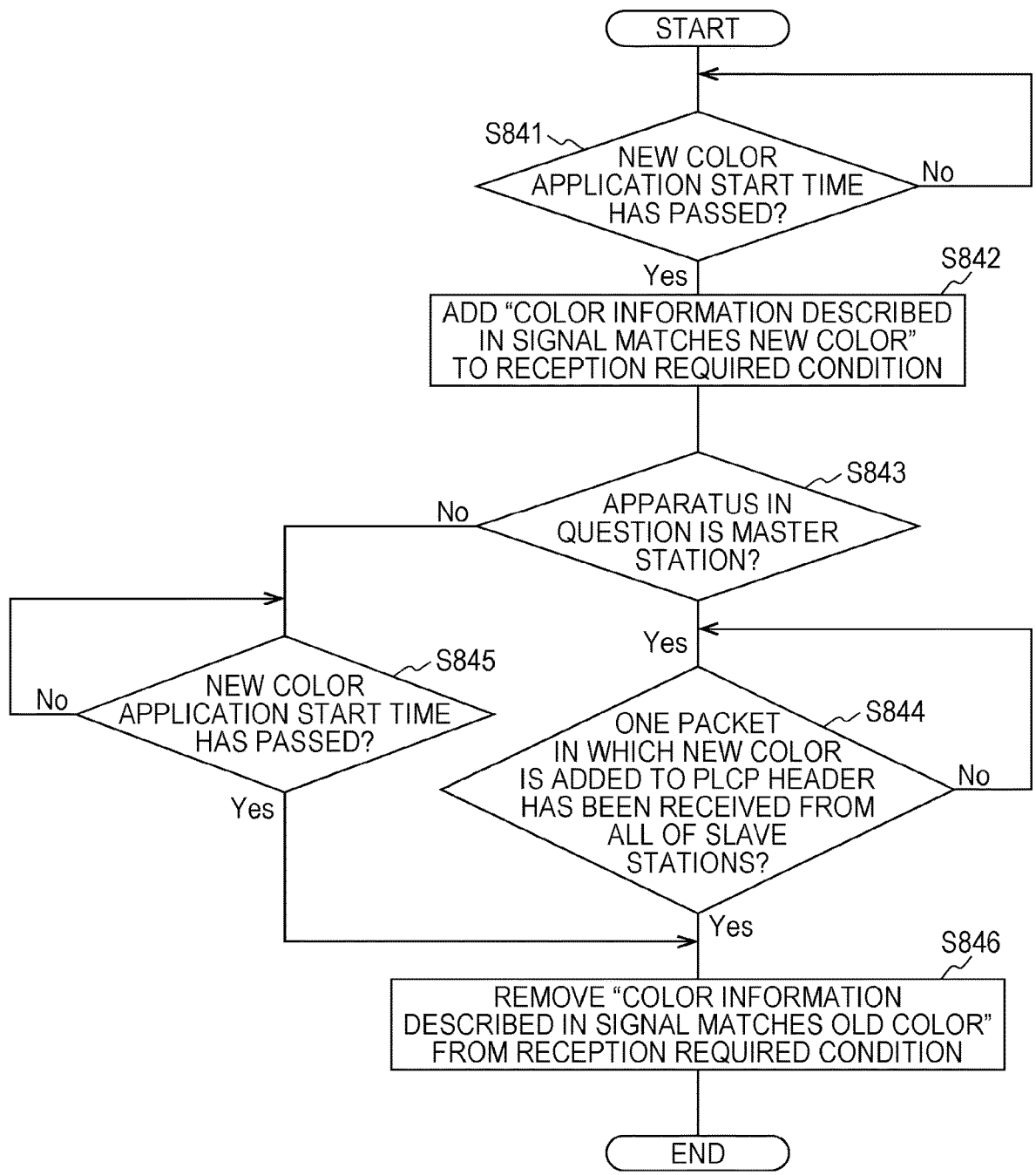
FIG. 11 is a flowchart showing an example of processing procedure of update processing of reception required condition performed by the information processing apparatus 200 according to the first embodiment of the present technology.

More specifically, after the COLOR Update Announce element occurs, each information processing apparatus (the master station and the slave station) updates the reception required condition in packet detection and reception determination processing shown in FIG. 4. FIG. 11 shows an example of operation of update processing of this reception required condition.

[Example of Operation of Update Processing of Reception Required Condition]

FIG. 11 is a flowchart showing an example of processing procedure of update processing of reception required condition performed by the information processing apparatus 200 according to the first embodiment of the present technology.

It should be noted that FIG. 11 shows only the example of operation of the information processing apparatus 200, but the other information processing apparatuses also perform the operation in a similar manner. For this reason, explanation about other information processing apparatuses will be omitted here.

First, the control unit 240 of the information processing apparatus 200 determines whether the new COLOR application start time has passed (step S841). In this case, the new COLOR application start time is stored in the Start Time for new COLOR Operation 326 shown in FIG. 9. In the case where the new COLOR application start time has not yet passed (step S841), monitoring is continued.

In the case where the new COLOR application start time has passed (step S841), the control unit 240 adds "the COLOR information (BSS COLOR) described in SIGNAL matches the new COLOR" to the reception required condition (step S842). It should be noted that, as described above, when the Start Time for new COLOR Operation 326 (shown in FIG. 9) is omitted, the master station can notify the slave station of the reception time (the reception time of the slave station) of the beacon frame including the COLOR Update Announcement 324 as the application start time of the new COLOR decided in the new COLOR deciding processing. In this case, the slave station can treat the reception time of the beacon frame as the new COLOR application start time.

Subsequently, the control unit 240 determines whether the apparatus in question is the master station or not (step S843). As described above, the information processing apparatus 200 is the master station (step S843), and therefore, step S844 is subsequently performed. Then, the control unit 240 determines whether at least one packet in which a new COLOR is added to the PLCP header has been received from all of the slave stations (step S844). In the case where any packet in which a new COLOR is added to the PLCP header has not been received from all of the slave stations (step S844), monitoring is continued.

In the case where at least one packet in which a new COLOR is added to the PLCP header has been received from all of the slave stations (step S844), the control unit 240 removes "the COLOR information described in SIGNAL matches the old COLOR" from the reception required condition (step S846)

On the other hand, in the case where the apparatus in question is an apparatus that is not the master station (step S843), a determination is made as to whether the new COLOR application start time has passed or not (step S845). In the case where the new COLOR application start time has not yet passed (step S845), monitoring is continued.

In the case where the new COLOR application start time has passed (step S845), step S846 is subsequently performed.

As described above, after the new COLOR application start time, "the COLOR information described in SIGNAL matches the new COLOR" is added and applied to the reception required condition. Further, until the old COLOR application end time, "the COLOR information described in SIGNAL matches the old COLOR" is applied to the reception required condition.

On the other hand, while the master station receives at least one packet having a new COLOR added to its PLCP header from all the slave stations, the master station applies "the COLOR information described in SIGNAL matches the old COLOR" to the reception required condition.

Further, when the master station starts transmission of the COLOR Update Announce element, the master station performs update processing of the reception required condition shown in FIG. 11. On the other hand, when the slave station receives the COLOR Update Announce element, the slave station performs update processing of the reception required condition shown in FIG. 11.

As described above, when the control unit 240 changes the BSS COLOR of the BSS in question (when notifying the slave station of the new COLOR), the control unit 240 performs control to change a condition (for example, packet filtering condition) for terminating the reception processing of the packet in the middle of processing. In addition, until the control unit 240 receives a packet in which new COLOR is applied to the physical header from all the slave stations which belong to the BSS in question, the control unit 240 processes packets applied with any one of the old COLOR and the new COLOR in the reception processing.

Likewise, in the case where the slave station receives, from the master station, the change information indicating that the BSS COLOR of the BSS in question is to be changed, the slave station performs control to change the packet filtering condition using the BSS COLOR on the basis of the change information. Further, in the case where designation information designing the starting timing for starting the use of the new COLOR is included in the change information, the slave station processes packets including information about the new COLOR in the reception processing after the start timing. Further, in the case where the designation information designing the end timing for ending the use of the new COLOR is included in the change information, the slave station processes packets including information about the old COLOR in the reception processing until the end timing.

[Example of Operation of COLOR Update Reflecting Processing]

Figure 12:
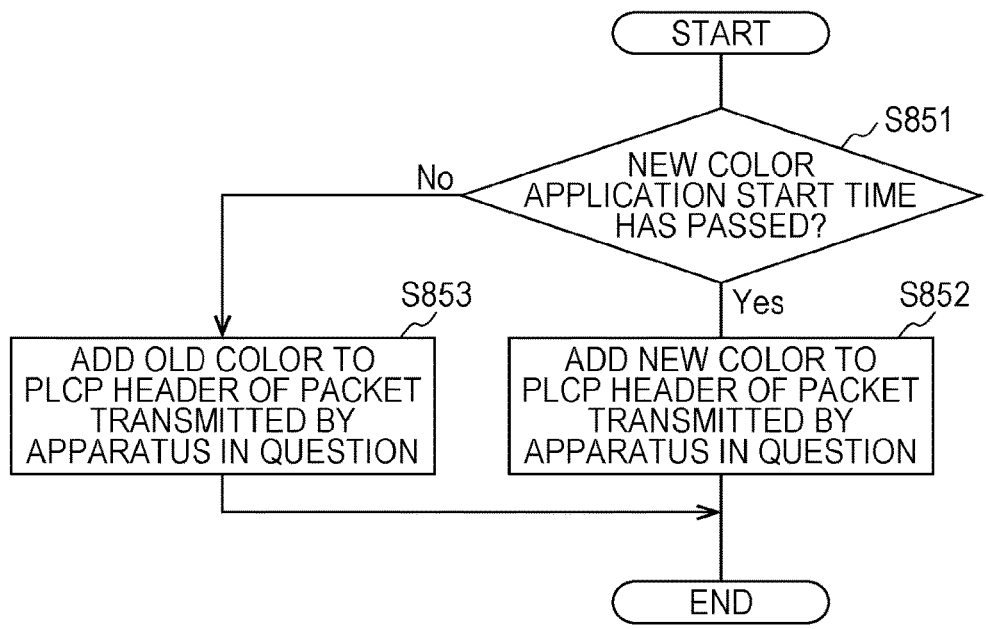
FIG. 12 is a flowchart showing an example of processing procedure of COLOR update reflecting processing performed by the information processing apparatus 200 according to the first embodiment of the present technology.

FIG. 12 is a flowchart showing an example of processing procedure of COLOR update reflecting processing performed by the information processing apparatus 200 according to the first embodiment of the present technology. It should be noted that FIG. 12 shows only the example of operation of the information processing apparatus 200, but the other information processing apparatuses also perform the operation in a similar manner.

For this reason, explanation about other information processing apparatuses will be omitted here.

First, the control unit 240 of the information processing apparatus 200 determines whether the new COLOR application start time has passed (step S851). In this case, the new COLOR application start time is stored in the Start Time for new COLOR Operation 326 shown in FIG. 9. It should be noted that if the Start Time for new COLOR Operation 326 is omitted and is not stored, the slave station sets the time when the slave station received the beacon frame containing the COLOR Update Announcement 324 as the application start time of new COLOR.

In the case where the new COLOR application start time has passed (step S851), the control unit 240 adds the new COLOR to the PLCP header of the packet transmitted by the apparatus in question (step S852). For example, the new COLOR is stored to HE-SIG-A304 shown in a of FIG. 3.

In the case where the new COLOR application start time has not passed (step S851), the control unit 240 adds the old COLOR to the PLCP header of the packet transmitted by the apparatus in question (step S853). For example, the old COLOR is stored to HE-SIG-A304 shown in a of FIG. 3.

As described above, after the new COLOR application start time, the new COLOR is added to the packet that the apparatus in question transmits, so that the packet with the new COLOR is transmitted.

Each processing described above is performed by each information processing apparatus (the master station and the slave station), so that even when BSS COLOR overlaps with OBSS, the BSS COLOR setting can be updated and reflecting according to the situation, and the packet filtering can be performed appropriately.

2. Second Embodiment

The first embodiment of the present technology shows an example of randomly deciding a new COLOR. The second embodiment of the present technology shows an example of deciding a new COLOR according to a predetermined rule (operation rule).

Additionally, the first embodiment of the present technology shows an example in which the master station detects overlapping of the BSS COLOR. The second embodiment of the present technology shows an example in which the slave station detects the overlapping of the BSS COLOR and notifies the detection result to the master station.

It should be noted that the configuration of the information processing apparatus according to the second embodiment of the present technology is substantially the same as those of the information processing apparatuses 100 to 103, 200, 201 shown in FIG. 1 and the like. For this reason, the same reference numerals as those of the first embodiment of the present technology are attached to the portions common to those of the first embodiment of the present technology, and some of these explanations thereabout will be omitted.

[Example of Operation of Initial COLOR Deciding Processing]

In the second embodiment of the present technology, the master station sets initial COLOR information according to a predetermined computation rule. For example, the initial COLOR information C1 can be decided by using the calculation expression shown in the expression 1 below.

$$C1 = (\text{Hash}([\text{TSF\_seif}/2^{30}] + \text{BSSID\_seif})) \bmod N\_color \quad \text{Expression 1}$$

In this case, Hash ( ) indicates a hash function having deciding property and uniqueness. Further, N_color indicates the number of possible COLOR value candidates. Further, TSF_seif indicates the current Timing Synchronization Function (TSF) timer value of the BSS to which the apparatus in question belongs. Further, BSSID_self indicates the BSSID of the BSS to which the apparatus in question belongs. More specifically, in this example, BSSID_self indicates the value (48 bits) of the MAC address of the apparatus in question, i.e., the master station.

As described above, the TSF addition value is used upon being rounded with 230. As a result, even if COLOR operation start processing is performed in OBSS at a close time, the Hash function can greatly reduce the chance that the initial COLORs of them both overlap each other if the values in the portion other than the BSSID match each other. However, the timing is extremely rarely synchronized in units of TSFs in a strict manner. For this reason, in order to absorb the time difference and to prevent the same COLOR value from being calculated each time, round processing is performed. For example, if the granularity of rounding is 230, the granularity is about 15 minutes. It should be noted that the rounding granularity is not limited to 230 and other values may be used.

[Example of Initial COLOR Sharing Processing]

The initial COLOR sharing processing according to the second embodiment of the present technology is equivalent to that of the first embodiment of the present technology.

Therefore, the explanation about the initial COLOR sharing processing according to the second embodiment of the present technology is omitted.

[Example of Format of COLOR Overlapping Detection Report Frame]

Figure 13:
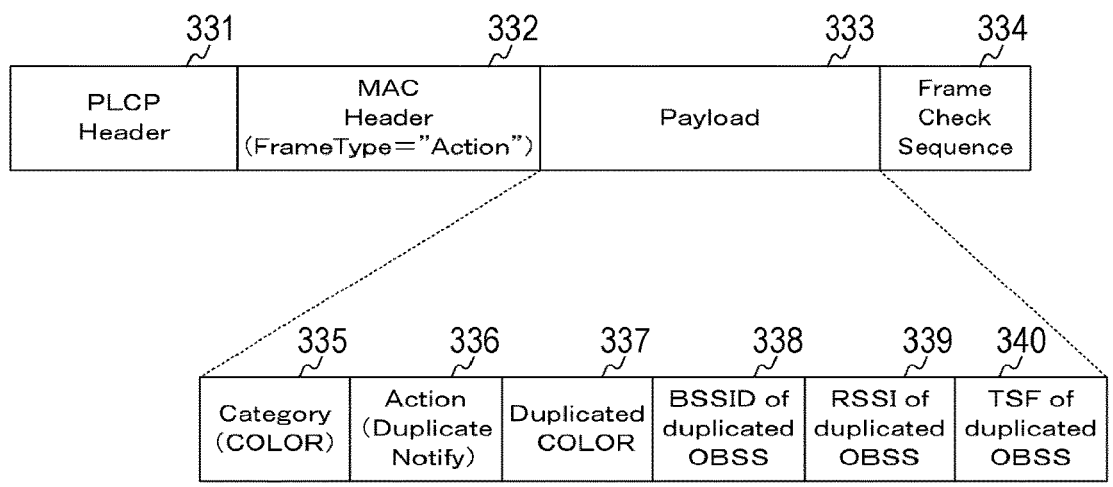
FIG. 13 is a diagram showing an example of a format of a COLOR overlapping detection report frame exchanged between the apparatuses constituting the communication system 10 according to a second embodiment of the present technology.

FIG. 13 is a diagram showing an example of a format of a COLOR overlapping detection report frame exchanged between the apparatuses constituting the communication system 10 according to the second embodiment of the present technology.

The COLOR overlapping detection report frame includes a PLCP Header 331, a MAC Header 332, a Payload 333, and a Frame Check Sequence (FCS) 334.

The Payload 333 includes a Category 335, an Action 336, a Duplicated COLOR 337, a BSSID of duplicated OBSS 338, an RSSI of duplicated OBSS 339, and a TSF of duplicated OBSS 340.

The Category 335 stores information indicating that it is a COLOR overlapping detection report frame.

The Action 336 stores information indicating that overlapping BSS COLOR is detected.

The Duplicated COLOR 337 stores information about the overlapping BSS COLOR detected by the slave station.

The BSSID of duplicated OBSS 338 stores the BSSID (the BSS identifier of the MAC layer) of the network sending the overlapping BSS COLOR detected by the slave station.

The RSSI of duplicated OBSS 339 stores the RSSI (reception level) of the packet from the OBSS of the overlapping BSS COLOR that is detected in the slave station.

The TSF of duplicated OBSS 340 stores the TSF value obtained from the beacon from the OBSS of the overlapping BSS COLOR detected in the slave station.

It should be noted that the RSSI and the TSF are used as auxiliary information when the master station decides a new COLOR. It should be noted that in the case where at least one of the RSSI and the TSF can be obtained by the master station side, the obtainable information can be omitted from the transmission from the slave station.

[Example of Operation of COLOR Overlapping Detection Processing (Slave Station)]

Figure 14:
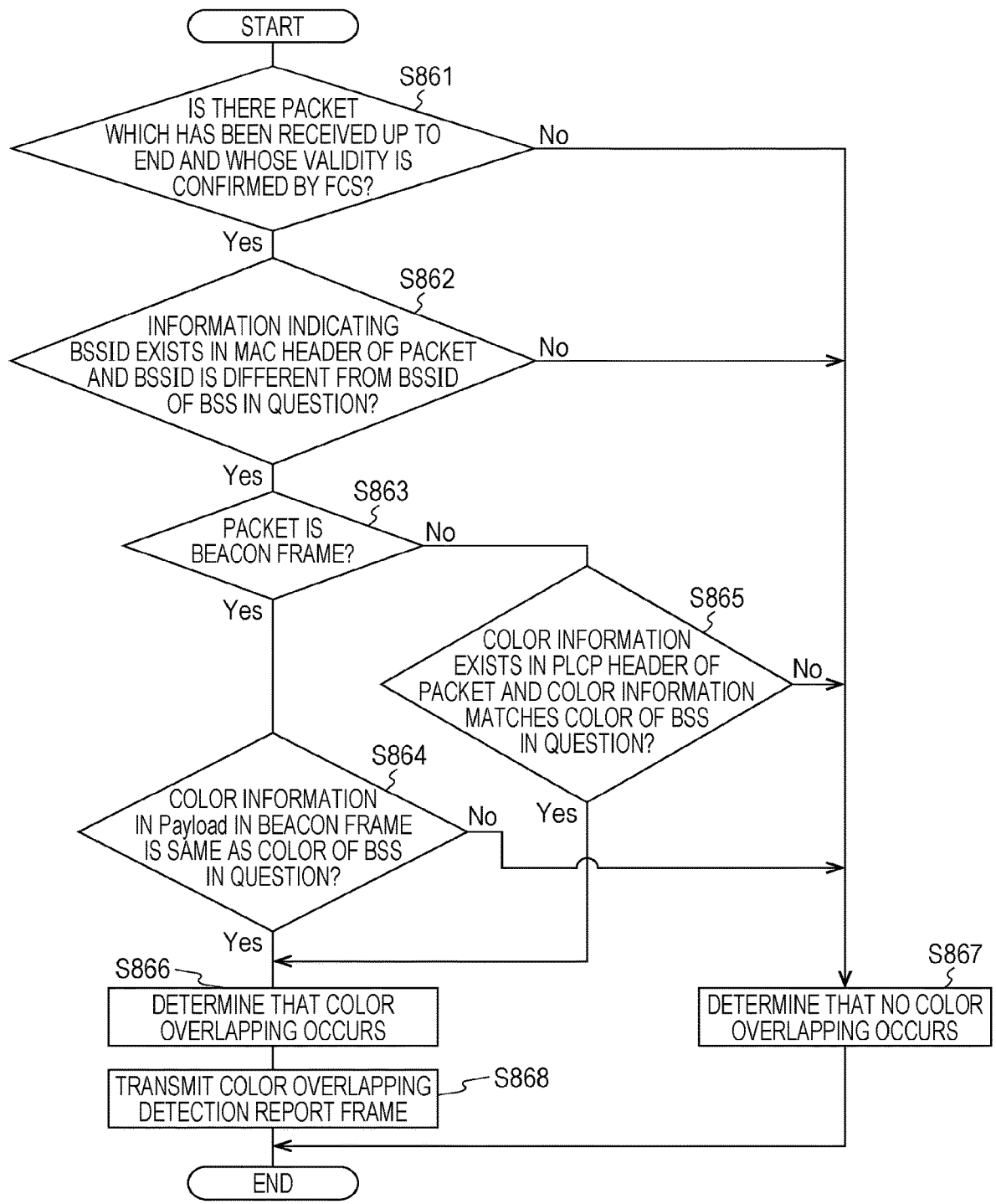
FIG. 14 is a flowchart showing an example of processing procedure of COLOR overlapping detection processing performed by the information processing apparatus 100 according to the second embodiment of the present technology.

FIG. 14 is a flowchart showing an example of processing procedure of COLOR overlapping detection processing performed by the information processing apparatus 100 according to the second embodiment of the present technology. It should be noted that this example shows the example of the information processing apparatus 100, but other slave stations are also similar thereto.

Incidentally, each processing procedure (steps S861 to S867) shown in FIG. 14 corresponds to each processing procedure (steps S821 to S827) shown in FIG. 6. Therefore, the explanation thereabout is omitted.

In the case where the control unit of the information processing apparatus 100 (corresponding to the control unit 240 shown in FIG. 2) determines that BSS COLOR is overlapping (step S866), the control unit of the information processing apparatus 100 transmits a COLOR overlapping detection report frame for reporting the overlapping BSS COLOR to the master station (step S868). For example, the COLOR overlapping detection report frame shown in FIG. 13 is transmitted.

In this case, the control unit of the information processing apparatus 100 obtains each piece of information included in the COLOR overlapping detection report frame in the COLOR overlapping detection processing. For example, the control unit of the information processing apparatus 100 obtains the BSSID of the network that transmitted the overlapping BSS COLOR, the RSSI of the packet from the OBSS of the overlapping BSS COLOR, the TSF value obtained from the beacon from the OBSS of the overlapping COLOR, and the like. Then, the control unit of the information processing apparatus 100 incorporates each piece of information thus obtained into the COLOR overlapping detection report frame, and transmits the COLOR overlapping detection report frame.

It should be noted that, regardless of presence or absence of overlapping detection, the information processing apparatus 100 may notify the devices around the information processing apparatus 100 of information about the COLOR used in the surroundings of the information processing apparatus 100 obtained in the COLOR overlapping detection processing. At this occasion, not only the COLOR information but also the BSSID used in the BSS corresponding to the COLOR and the RSSI at which the frame carrying the COLOR information is received may also be notified. In that case, in the case where multiple COLORs used around the information processing apparatus 100 are detected, each of the multiple COLORs may be notified.

The method of notification may be not only a notification of a unicast designating a destination, or may be in a form of notification in which broadcast or multicast is designated as a destination. Further, an example of a format of a COLOR monitor result notification frame is shown in FIG. 8.

As described above, in the case where the control unit of the information processing apparatus 100 detects that the BSS COLOR of the BSS in question matches the BSS COLOR of the OBSS, the control unit of the information processing apparatus 100 transmits notification information for notifying the master station of the detection result. For example, the COLOR overlapping detection report frame as shown in FIG. 13 is transmitted.

Further, the information processing apparatus 100 may receive not only the detection result of the apparatus in question but also a COLOR monitor result notification frame (shown in FIG. 8) transmitted from a master station or a slave station of another BSS, and may detect overlapping of the BSS COLOR on the basis of the contents of the detection result and the COLOR monitor result notification frame.

[Example of Operation of COLOR Overlapping Detection Processing (Master Station)]

Figure 15:
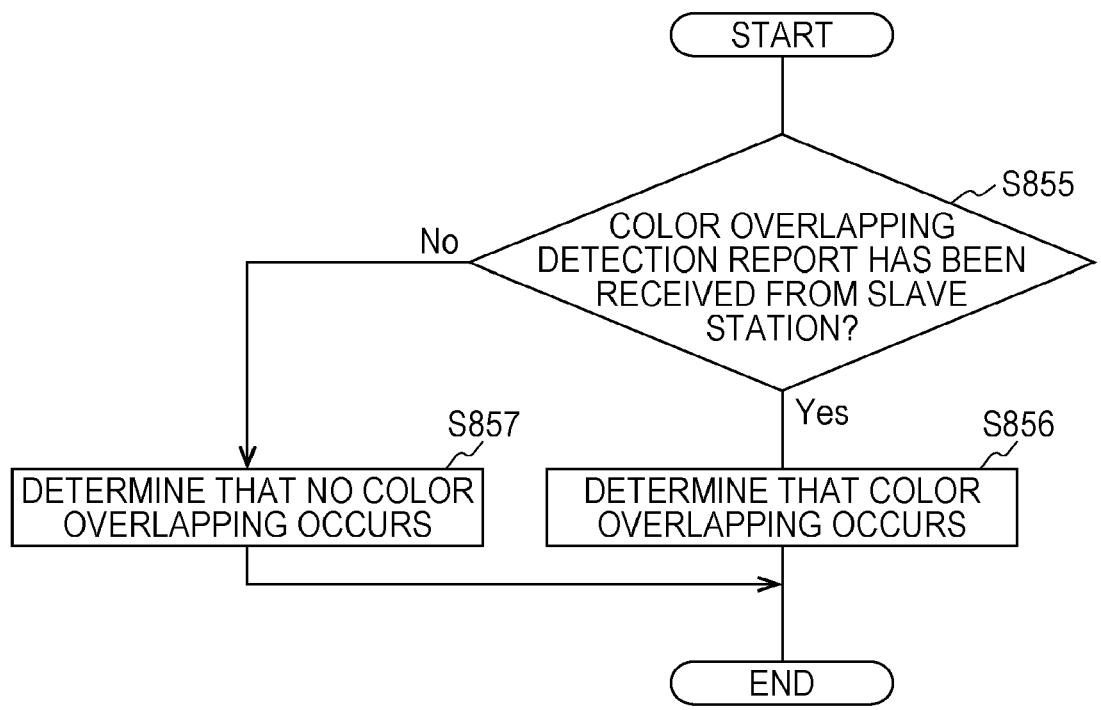
FIG. 15 is a flowchart showing an example of processing procedure of COLOR overlapping detection processing performed by the information processing apparatus 200 according to the second embodiment of the present technology.

FIG. 15 is a flowchart showing an example of processing procedure of COLOR overlapping detection processing performed by the information processing apparatus 200 according to the second embodiment of the present technology. It should be noted that this example shows the example of the information processing apparatus 200, but the other information processing apparatuses also perform the operation in a similar manner.

First, the control unit 240 of the information processing apparatus 200 determines whether, the control unit 240 of the information processing apparatus 200 has received a COLOR overlapping detection report from a slave station or not (step S855). For example, a determination is made as to whether a COLOR overlapping detection report frame shown in FIG. 13 has been received or not.

In the case where the COLOR overlapping detection report is received from the slave station (step S855), the control unit 240 determines that COLOR overlaps (step S856). On the other hand, in the case where the COLOR overlapping detection report has not been received from the slave station (step S855), the control unit 240 determines that COLOR is not overlapping (step S857).

As described above, in the case where the control unit 240 of the information processing apparatus 200 receives match detection notification (COLOR overlapping detection report) of BSS COLOR from the slave station, the control unit 240 of the information processing apparatus 200 determines that BSS COLOR is determined to be overlapping.

It should be noted that this example shows an example in which the information processing apparatus 200 detects overlapping BSS COLOR on the basis of the COLOR overlapping detection report frame from the slave station. However, as shown in the first embodiment of the present technology, the information processing apparatus 200 may also perform COLOR overlapping detection processing in the apparatus in question. As described above, both of the master station and the slave station perform the COLOR overlapping detection processing, the detection precision of overlapping BSS COLOR can be improved, and the detection can be made at an earlier point in time.

Further, the information processing apparatus 200 may receive not only the overlapping report from the client slave station and the detection result of the apparatus in question but also a COLOR monitor result notification frame (shown in FIG. 8) transmitted from a master station or a slave station of another BSS, and may detect overlapping of the BSS COLOR on the basis of the contents of the overlapping report, the detection result, and the COLOR monitor result notification frame.

[Example of Operation of New COLOR Deciding Processing]

The information processing apparatus 200 that detects the overlapping COLOR decides a new COLOR. For example, like the first embodiment of the present technology, after the control unit 240 of the information processing apparatus 200 detects the overlapping COLOR, the control unit 240 of the information processing apparatus 200 monitors beacons in the surrounding. However, in the case where the overlapping detection report frame from the slave station includes TSF information obtained from the beacon at the OBSS side, the monitor thereof may be omitted. On the other hand, the TSF information does not exist in the overlapping detection report frame from the slave station, the control unit 240 of the information processing apparatus 200 obtains the TSF information used in the OBSS by monitoring the beacon in the surroundings.

Further, instead of randomly selecting a new COLOR, the control unit 240 of the information processing apparatus 200 decides a new COLOR according to a predetermined computation rule. The BSSID and the OBSS time information about the BSS in question and the overlapping BSS are used as inputs for this calculation expression. For example, the new COLOR information C2 can be decided by using the calculation expression shown in the following expression 2.

$$C2=(\text{Hash}([(TSF\_seif+TSF\_overlap)/2^{30}]+BSSID\_seif))\bmod N\_color \quad \text{Expression 2}$$

In this case, Hash ( ), N_color, TSF_seif, and BSSID_self are the same as the information shown in the expression 1. On the other hand, TSF_overlap denotes the TSF value of the OBSS in which overlapping COLOR is detected. It should be noted that TSF_overlap may be a value contained in an overlapping detection report frame transmitted from the slave station or a value obtained from a beacon obtained through monitoring performed by the apparatus in question.

As described above, the TSF addition value is used upon being rounded with $2^{30}$. As a result, even if the COLOR overlapping detection is also made in the OBSS and similar, new COLOR deciding processing is performed, the Hash function can greatly reduce the chance that the new COLORs of them both overlap each other if the values in the portion other than the BSSID match each other. However, the timings of the overlapping detection and the deciding processing generally do not match between BSSes. For this reason, in order to absorb the time difference and to prevent the same COLOR value from being calculated each time, round processing is performed. For example, if the granularity of rounding is $2^{30}$, the granularity is about 15 minutes. It should be noted that the rounding granularity is not limited to 230 and other values may be used.

In this case, the calculation expression is not limited to the calculation expression of the expression 2, as long as it is a calculation method that does not yield new COLORS which overlap again between OBSSes. For example, when the absolute time (for example, Global Positioning System (GPS) and the like) can be used, for example, the new COLOR information C3 can be decided by using the calculation expression as shown in the expression 3 below. It should be noted that the expression 3 shows an example in the case where the granularity is set to about 15 minutes.

$$C3 = (\text{Hash}([UTC\_sec/900] + BSSID\_seif)) \bmod N\_color \quad \text{expression 3}$$

In this case, UTC_sec indicates the second-converted value of the Coordinated Universal Time (UTC) time of the absolute time. As described above, the new COLOR can be decided using a calculation expression determined in advance on the basis of the BSSID and the information about current time.

[Example of a Format of Beacon Frame]

Figure 16:
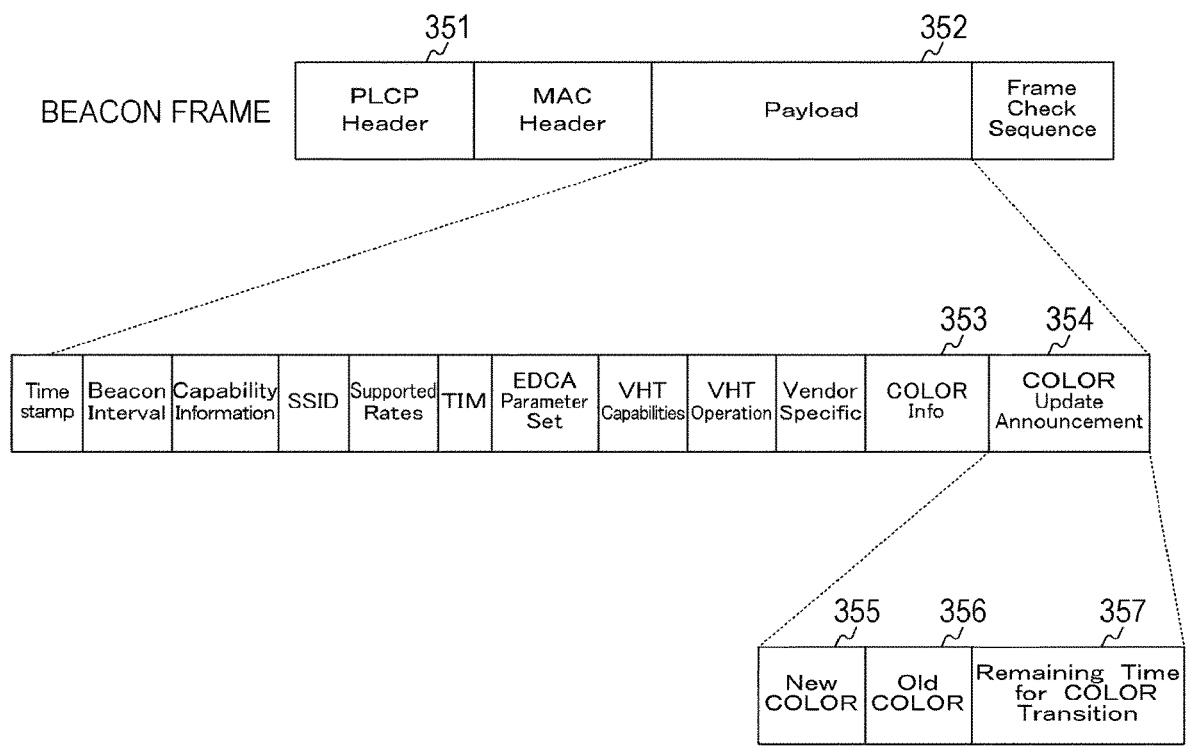
FIG. 16 is a diagram showing an example of a format of a beacon frame exchanged between the apparatuses constituting the communication system 10 according to the second embodiment of the present technology.

FIG. 16 is a diagram showing an example of a format of a beacon frame exchanged between the apparatuses constituting the communication system 10 according to the second embodiment of the present technology.

Like the first embodiment of the present technology, the COLOR info 353 of the Payload 352 in the beacon frame stores the COLOR information (BSS COLOR) about the BSS in question. Further, the COLOR info 353 is a field that is provided at all times.

Additionally, like the first embodiment of the present technology, in order to always receive the beacon frame, the PLCP Header 351 in the beacon frame does not store the COLOR information (BSS COLOR) about the BSS in question.

Additionally, in the second embodiment of the present technology, a field (COLOR Update Announcement 354) for notifying the slave station of the new COLOR decided in the new COLOR deciding processing is provided in the Payload 352 during an update transition period. More specifically, only when a COLOR change occurs, the COLOR Update Announce element (COLOR Update Announcement 354) is added.

The New COLOR 355 of COLOR Update Announcement 354 stores the new COLOR decided in the new COLOR deciding processing.

The Old COLOR 356 of the COLOR Update Announcement 354 stores the old COLOR in which COLOR overlapping is detected in the COLOR overlapping detection processing.

The Remaining Time for COLOR Transition 357 of the COLOR Update Announcement 354 stores a transition period remaining time of the new COLOR decided in the new COLOR deciding processing. The unit of the transition period remaining time can be a Timing Synchronization Function (TSF) timer unit. Additionally, the unit of the transition period remaining time may be a Target Beacon Transmission Time (TBTT) unit.

Further, the transition period remaining time is updated and notified for each beacon transmission. More specifically, the information processing apparatus 200 transmits a beacon including the transition period remaining time which is subtracted for each beacon transmission.

Further, the COLOR Update Announce element is preferably notified at least from the time when the COLOR change occurs to when the COLOR transition period remaining time finishes. More specifically, at least from the time when the COLOR change occurs to when the COLOR transition period remaining time finishes, the COLOR Update Announcement 354 is provided in the beacon transmitted from the information processing apparatus 200.

As described above, the beacon frame shown in FIG. 16 can be understood as the update advance notification frame of the BSS COLOR. Further, in order to improve the chance that the slave station can successfully perform reception, the update advance notification frame is transmitted multiple times at least from the time when the COLOR change occurred to the old COLOR application end time. Further, the new COLOR application start time is a time when the slave station receives the update advance notification, and the update advance notification frame designates the remaining time length of the transition period until the end of the application of the old COLOR.

[Example of COLOR Update Notification Processing]

When a new COLOR is decided in the new COLOR deciding processing, the information processing apparatus 200 performs COLOR update notification processing to notify the slave station of the decided new COLOR.

For example, the information processing apparatus 200 can notify the slave station of the decided new COLOR with the beacon (for example, the beacon frame as shown in FIG. 16). In this case, the second embodiment of the present technology shows an example in which a format different from that of the first embodiment of the present technology is used to notify the remaining time of the COLOR transition period the instead of the absolute time of the end of the old COLOR and the start of the new COLOR.

Further, for example, the information processing apparatus 200 may individually notify the slave station of the declined new COLOR with a Management frame or a Broadcast data frame.

[Example of Operation of COLOR Update Reflecting Processing]

Each information processing apparatus (the master station, the slave station) constituting the communication system 10 performs COLOR update reflecting processing for reflecting a change to a new COLOR. This COLOR update reflecting processing is done in both of the master station and the slave station.

More specifically, after the COLOR Update Announce element occurs, each information processing apparatus (the master station and the slave station) updates a reception required condition in the packet detection and reception determination processing as shown in FIG. 4. An example of operation of update processing of this reception required condition is shown in FIG. 17.

[Example of Operation of Update Processing of Reception Required Condition]

Figure 17:
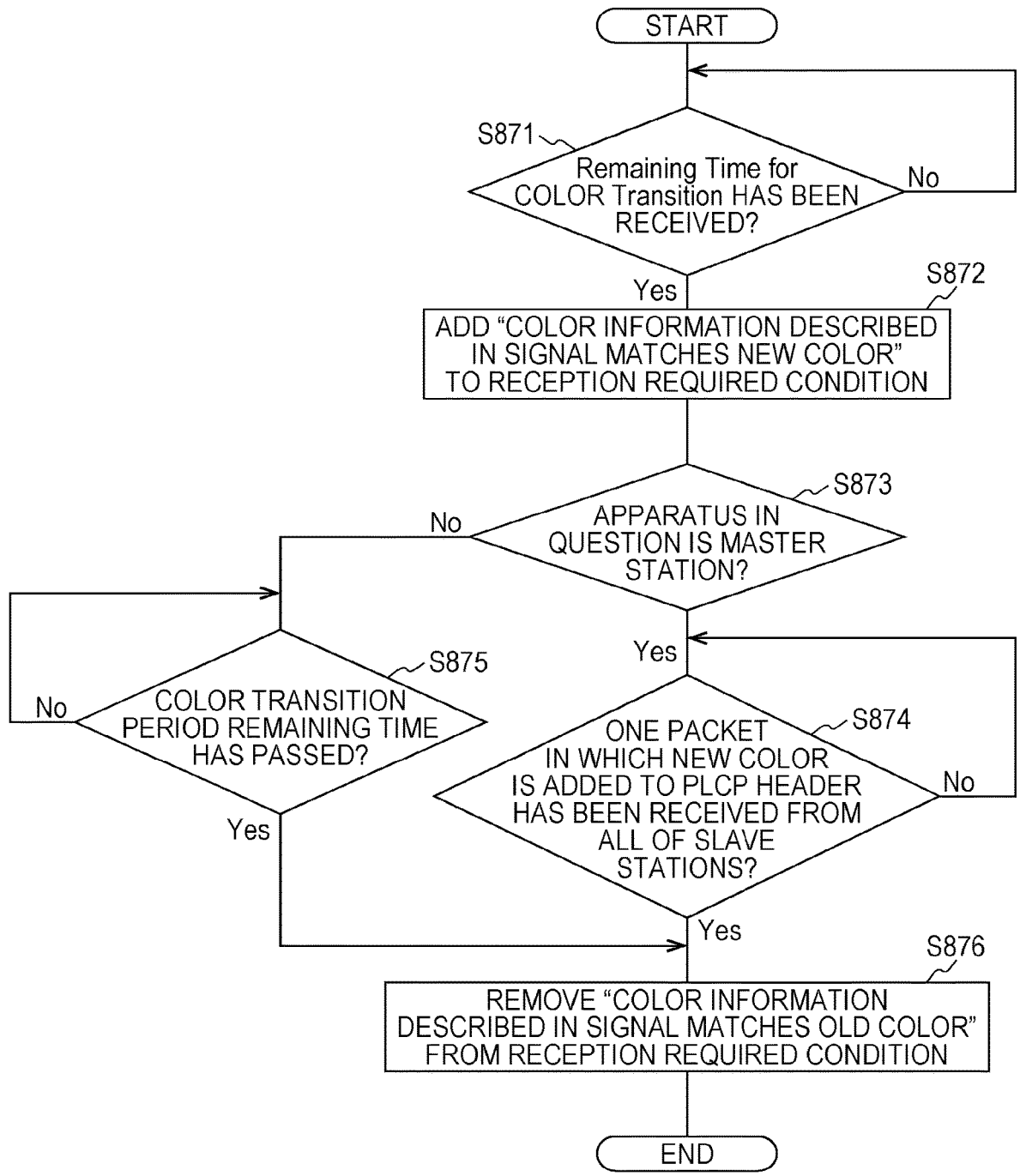
FIG. 17 is a flowchart showing an example of processing procedure of update processing of a reception required condition performed by the information processing apparatus 200 according to the second embodiment of the present technology.

FIG. 17 is a flowchart showing an example of processing procedure of update processing of a reception required condition performed by the information processing apparatus 200 according to the second embodiment of the present technology. It should be noted that FIG. 17 shows only an example of operation of the information processing apparatus 200, but the other information processing apparatuses also perform the operation in a similar manner. For this reason, explanation about other information processing apparatuses will be omitted here.

Further, each processing procedure (steps S872 to S874, S876) shown in FIG. 17 corresponds to each processing procedure (steps S841 to S844, S846) shown in FIG. 11. Therefore, explanation thereabout is omitted.

First, the control unit 240 of the information processing apparatus 200 determines whether the control unit 240 of the information processing apparatus 200 has received a beacon including COLOR Update Announcement (COLOR Update Announcement 354 shown in FIG. 16) (step S871). In the case where a beacon including COLOR Update Announcement has not been received (step S871), monitoring is continued.

In the case where a beacon including the COLOR Update Announcement is received (step S871), step S872 is subsequently performed.

On the other hand, in the case where the apparatus in question is not the master station (step S873), it is determined as to whether the COLOR transition period remaining time in the COLOR Update Announcement has passed or not (step S875). This COLOR transition period remaining time is the Remaining Time for COLOR Transition 357 shown in FIG. 16.

In the case where the COLOR transition period remaining time has not passed (step S875), monitoring is continued. On the other hand, in the case where the COLOR transition period remaining time has passed (step S875), step S876 is subsequently performed.

Each processing described above is performed by each information processing apparatus (the master station and the slave station), so that even when BSS COLOR overlaps with OBSS, the BSS COLOR setting can be updated and reflecting according to the situation, and the packet filtering can be performed appropriately.

3. Third Embodiment

The first and second embodiments of the present technology show an example of transmission in which the PLCP header in the beacon frame does not carry the BSS COLOR. For this reason, each slave station must receive a beacon frame from the OBSS.

In this case, the BSS COLOR is added to the PLCP header in the beacon frame, so that each slave station can perform filtering when the slave station receives the beacon frame. Thus, the reception efficiency can be further improved.

Therefore, the third embodiment of the present technology shows an example in which a BSS COLOR is added to the PLCP header in the beacon frame. However, when the BSS COLOR is added to the PLCP header in the beacon frame, the slave station may not be able to perform COLOR update. For example, when a COLOR Update Announcement cannot be received even once in the transition period in the case where the BSS COLOR is added to the PLCP header in the beacon frame, the COLOR update cannot be performed. As described above, the slave station that cannot perform the COLOR update will incorrectly perform the packet filtering.

Therefore, the third embodiment of the present technology shows an example in which the slave station performs the COLOR recovery processing in order to appropriately perform the COLOR update.

It should be noted that the configuration of the information processing apparatus according to the third embodiment of the present technology is substantially the same as the information processing apparatuses 100 to 103, 200, 201 as shown in FIG. 1 and the like. For this reason, the same reference numerals as those of the first embodiment of the present technology are attached to the portions common to those of the first embodiment of the present technology, and some of these explanations thereabout will be omitted.

[Example of Initial COLOR Deciding Processing]

As described above, the master station stores and transmits the BSS COLOR in the PLCP header in the beacon frame since the master station starts to operate.

[Example of Initial COLOR Sharing Processing]

From when the slave station starts scanning and establishes connection to when the slave station obtains the BSS COLOR, the slave station operates with the reception required condition being "all packet". More specifically, the reception required condition in the packet detection and reception determination processing as shown in FIG. 4 is set to "all packets".

[Example of COLOR Overlapping Detection Processing]

The COLOR overlapping detection processing according to the third embodiment of the present technology is similar to that of the first embodiment of the present technology, and therefore explanation thereabout is omitted.

[Example of New COLOR Deciding Processing]

The new COLOR deciding processing according to the third embodiment of the present technology is substantially similar to that of the first embodiment of the present technology. However, the new COLOR deciding processing according to the third embodiment of the present technology is different in that, only while the master station performs monitoring of the surroundings, the operation is performed with the reception required condition being "all packets".

[Example of COLOR Update Notification Processing]

The COLOR update notification processing according to the third embodiment of the present technology is also substantially similar to that of the first embodiment of the present technology. However, the COLOR update notification processing according to the third embodiment of the present technology is different in that, until the old COLOR application end time, the old COLOR is stored to the PLCP header in the beacon frame.

[Example of COLOR Update Reflecting Processing]

The COLOR update reflecting processing according to the third embodiment of the present technology is equivalent to that of the first embodiment of the present technology.

[Example of a Format of COLOR Information Obtaining Request Frame]

Figure 18:
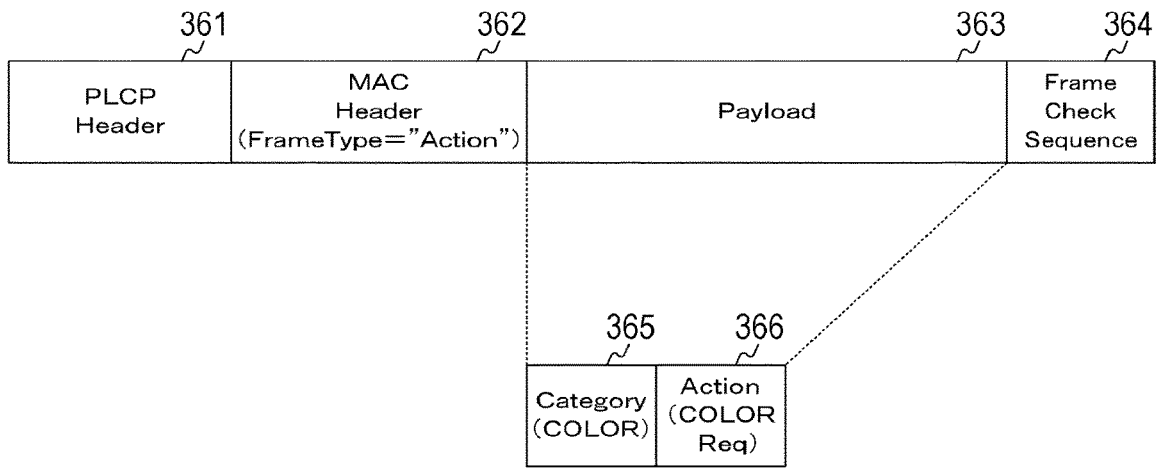
FIG. 18 is a diagram showing an example of a format of a COLOR information obtaining request frame exchanged between the apparatuses constituting the communication system 10 according to a third embodiment of the present technology.

FIG. 18 is a diagram showing an example of a format of a COLOR information obtaining request frame exchanged between the apparatuses constituting the communication system 10 according to the third embodiment of the present technology.

The COLOR information obtaining request frame includes a PLCP Header 361, a MAC Header 362, a Payload 363, and a Frame Check Sequence (FCS) 364.

The Payload 363 includes a Category 365 and an Action 366.

The Category 365 stores information indicating that it is a COLOR information obtaining request frame.

The Action 366 stores information indicating that a new COLOR is requested.

Further, in order to always receive the COLOR information obtaining request frame, the PLCP Header 361 does not store the COLOR information (BSS COLOR) about the BSS in question.

[Example of a Format of COLOR Information Obtaining Response Frame]

Figure 19:
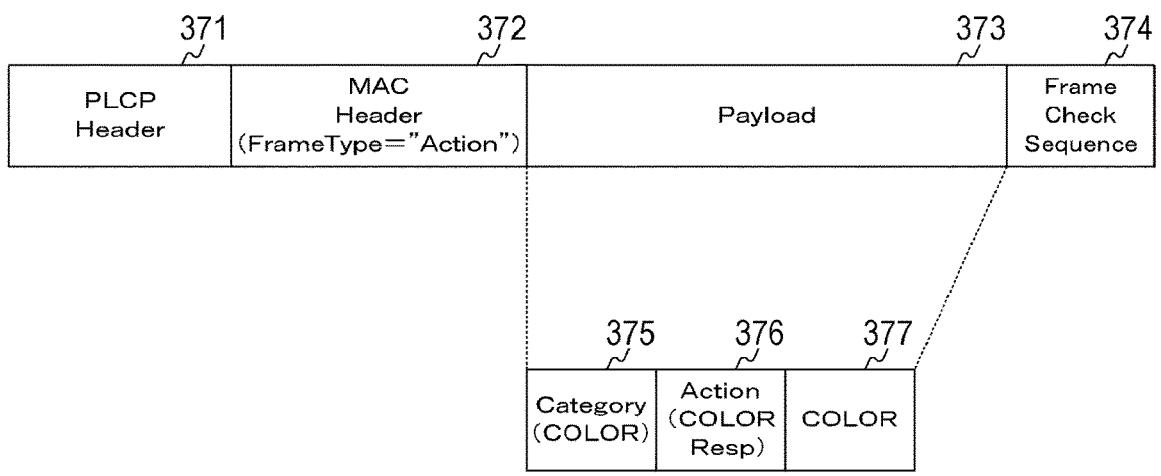
FIG. 19 is a diagram showing an example of a format of a COLOR information obtaining response frame exchanged between the apparatuses constituting the communication system 10 according to the third embodiment of the present technology.

FIG. 19 is a diagram showing an example of a format of a COLOR information obtaining response frame exchanged between the apparatuses constituting the communication system 10 according to the third embodiment of the present technology.

The COLOR information obtaining response frame includes a PLCP Header 371, a MAC Header 372, a Payload 373, and a Frame Check Sequence (FCS) 374.

The Payload 373 includes a Category 375, an Action 376, and a COLOR 377.

The Category 375 stores information indicating that it is a COLOR information obtaining response frame.

The Action 376 stores information indicating that it is a response to a COLOR information obtaining request.

The COLOR 377 stores information about a new COLOR decided in the new COLOR deciding processing.

Further, in order to always receive the COLOR information obtaining response frame, the PLCP Header 371 does not store the COLOR information (BSS COLOR) about the BSS in question.

[Example of Operation of COLOR Recovery Processing (Slave Station)]

Figure 20:
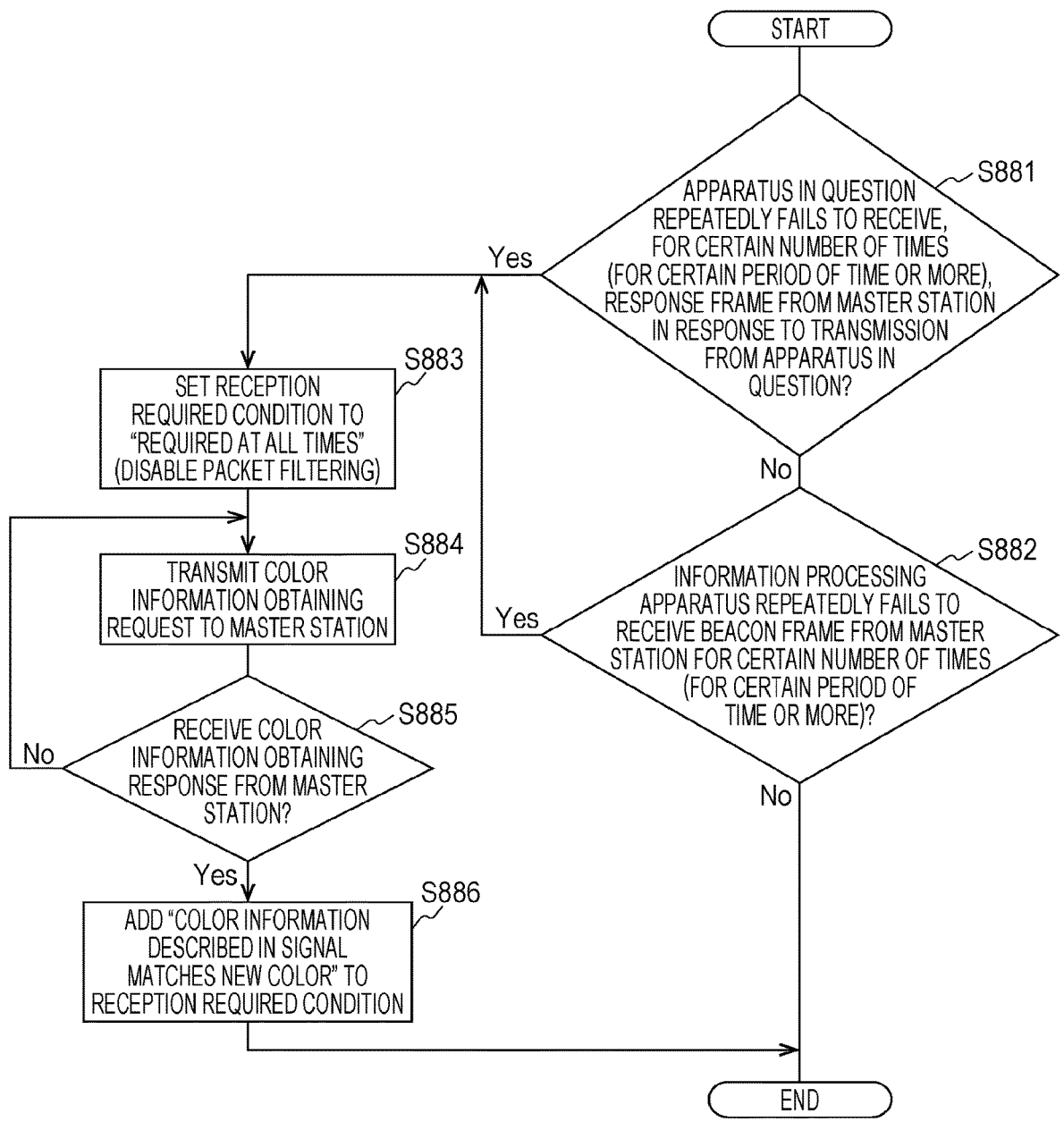
FIG. 20 is a flowchart showing an example of processing procedure of COLOR recovery processing performed by the information processing apparatus 100 according to the third embodiment of the present technology.

FIG. 20 is a flowchart showing an example of processing procedure of COLOR recovery processing performed by the information processing apparatus 100 according to the third embodiment of the present technology. It should be noted that this example shows the example of the information processing apparatus 100, but other slave stations are also similar thereto.

First, the control unit of the information processing apparatus 100 determines whether the apparatus in question repeatedly fails to receive, for a certain number of times, a response frame from the master station in response to a transmission from the apparatus in question (step S881). It should be noted that the control unit of the information processing apparatus 100 may determine whether the apparatus in question fails to receive, for a certain period of time, a response frame from the master station in response to a transmission from the apparatus in question (step S881).

As described above, the information processing apparatus 100 can determine that the BSS COLOR has changed when an expected response (for example, Ack) cannot be received on the basis of a certain number of times or a certain period of time.

In the case where the information processing apparatus 100 repeatedly fails to receive the response frame for a certain number of times (step S881), the control unit of the information processing apparatus 100 sets the reception required condition to "required at all times" (More specifically, the control unit of the information processing apparatus 100 sets the reception required condition to "all packets") (step S883) More specifically, the control unit of the information processing apparatus 100 disables the packet filtering (step S883).

Subsequently, the control unit of the information processing apparatus 100 transmits the COLOR information obtaining request to the master station (step S884). For example, the COLOR information obtaining request frame shown in FIG. 18 is transmitted to the master station (step S884). In this case, the control unit of the information processing apparatus 100 transmits the COLOR information obtaining request frame without storing the COLOR information (BSS COLOR) in the PLCP header of the COLOR information obtaining request frame.

Subsequently, the control unit of the information processing apparatus 100 determines whether the COLOR information obtaining response has been received from the master station or not (step S885). For example, the control unit of the information processing apparatus 100 determines whether the COLOR information obtaining response frame shown in FIG. 19 is received from the master station or not (step S885). Then, when the COLOR information obtaining response has not been received from the master station (step S885), step S884 is performed again.

In the case where the COLOR information obtaining response is received from the master station (step S885), the control unit of the information processing apparatus 100 adds "the COLOR information described in SIGNAL matches the new COLOR" to the reception required condition (step S886). More specifically, on the basis of the new COLOR stored in the received COLOR information obtaining response frame, the control unit of the information processing apparatus 100 updates the reception required condition, and enables the packet filtering again.

In the case where the information processing apparatus 100 repeatedly fails to receive the response frame for a certain number of times (step S881), the control unit of the information processing apparatus 100 determines whether the information processing apparatus 100 repeatedly fails to receive the beacon frame from the master station for a certain number of times (step S882). It should be noted that the control unit of the information processing apparatus 100 may determine whether the information processing apparatus 100 repeatedly fails to receive the beacon frame from the master station for a certain period of time or more (step S882).

In the case where the information processing apparatus 100 does not repeatedly fail to receive the beacon frame from the master station for the certain number of times (step S882), the operation of the COLOR recovery processing is terminated. On the other hand, in the case where the information processing apparatus 100 repeatedly fails to receive the beacon frame from the master station for the certain number of times (step S882), step S883 is subsequently performed.

As described above, in the case where the information processing apparatus 100 cannot receive the beacon frame from the master station on the basis of a certain number of times or a certain period of time, the COLOR may be determined to have changed.

As described above, in the case where the control unit of the information processing apparatus 100 cannot receive the packet including the BSS COLOR of the BSS in question in the physical header for a certain period of time, the control unit of the information processing apparatus 100 transmits the COLOR information obtaining request (request information) to the master station to confirm the BSS COLOR of the BSS in question. Further, in the case where the control unit of the information processing apparatus 100 cannot receive the packet including the BSS COLOR of the BSS in question in the physical header for a certain period of time, the control unit of the information processing apparatus 100 may transmit the request information for requesting the change of the BSS COLOR to the master station. In this case, in response to a request from the information processing apparatus 100, the master station changes the BSS COLOR and transmits the change information thereabout to the information processing apparatus 100.

Further, while the control unit of the information processing apparatus 100 waits for a response to the COLOR information obtaining request, the control unit of the information processing apparatus 100 performs the reception processing of all the detected packets.

[Example of Operation of COLOR Recovery Processing (Example of Operation of Master Station)]

Figure 21:
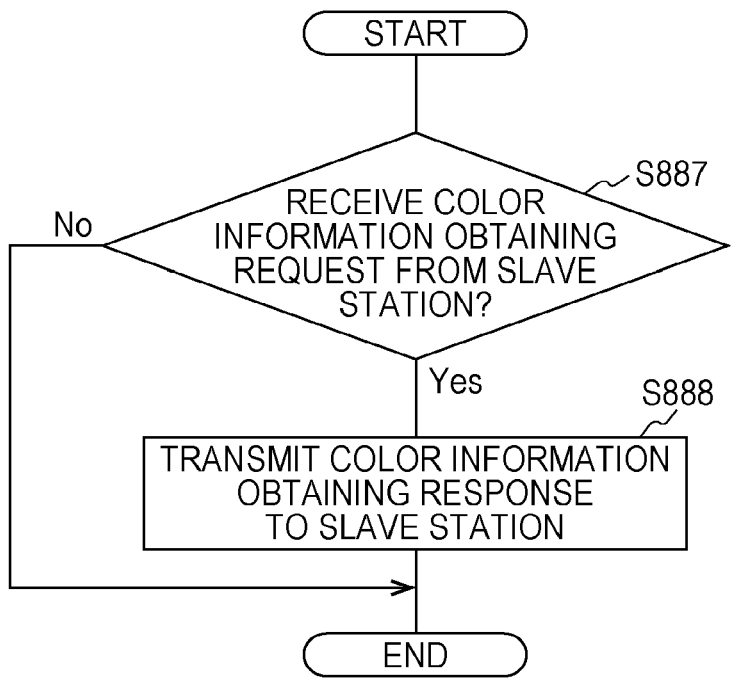
FIG. 21 is a flowchart showing an example of processing procedure of COLOR recovery processing performed by the information processing apparatus 200 according to the third embodiment of the present technology.

FIG. 21 is a flowchart showing an example of processing procedure of COLOR recovery processing performed by the information processing apparatus 200 according to the third embodiment of the present technology. It should be noted that this example shows the example of the information processing apparatus 200, but other master stations are also similar thereto.

First, the control unit 240 of the information processing apparatus 200 determines whether the control unit 240 of the information processing apparatus 200 has received a COLOR information obtaining request from the slave station (step S887). In the case where the COLOR information obtaining request has not received from the slave station (step S887), the operation of the COLOR recovery processing is terminated.

In the case where the COLOR information obtaining request is received from the slave station (step S887), the control unit 240 transmits a COLOR information obtaining response storing a new COLOR to the slave station that transmitted the COLOR information obtaining request (step S888). For example, the COLOR information obtaining response frame shown in FIG. 19 (the new COLOR is stored in the COLOR 377) is transmitted.

In this case, the control unit 240 transmits the COLOR information obtaining response frame without storing the COLOR information (BSS COLOR) in the PLCP header 371 of the COLOR information obtaining response frame.

As described above, even in the case where the transition period is finished without receiving any COLOR update information, the slave station can estimate its state and request the master station to provide a new COLOR to obtain the new COLOR.

4. Fourth Embodiment

The first to third embodiments of the present technology shows an example in which the master station triggers the operation start of the BSS COLOR.

The fourth embodiment of the present technology shows an example in which, among the BSSes already operating, the slave station triggers the operation start of the BSS COLOR after the connection is established.

It should be noted that the configuration of the information processing apparatus according to the fourth embodiment of the present technology is substantially the same as the configurations of the information processing apparatuses 100 to 103, 200, 201 as shown in FIG. 1 and the like. For this reason, the same reference numerals as those of the first embodiment of the present technology are attached to the portions common to those of the first embodiment of the present technology, and some of these explanations thereabout will be omitted.

[Example of Communication]

Figure 22:
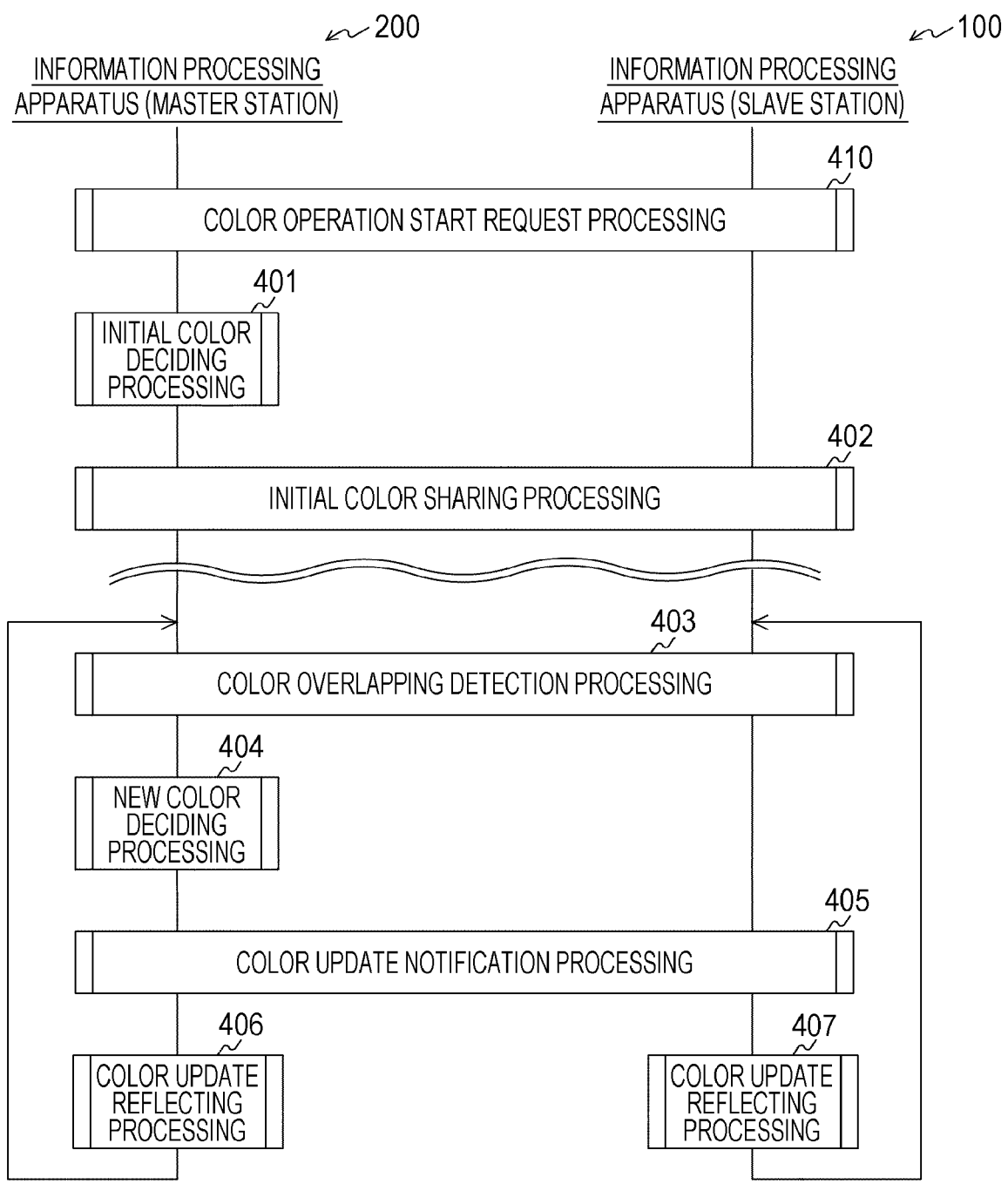
FIG. 22 is a sequence chart showing an example of communication processing between the apparatuses constituting the communication system 10 according to a fourth embodiment of the present technology.

FIG. 22 is a sequence chart showing an example of communication processing between the apparatuses constituting the communication system 10 according to a fourth embodiment of the present technology. It should be noted that FIG. 22 is an example in which the COLOR operation start request processing is added to the communication example as shown in FIG. 5. Therefore, portions common to FIG. 5 are denoted with the same reference numerals as those of FIG. 5, and some of the explanations thereabout are omitted.

First, the COLOR operation start request processing is performed between the information processing apparatus 200 and the information processing apparatus 100 (410). This COLOR operation start request processing will be explained in details with reference to FIG. 24 and FIG. 25.

[Example of a Format of COLOR Operation Start Request Frame]

Figure 23:
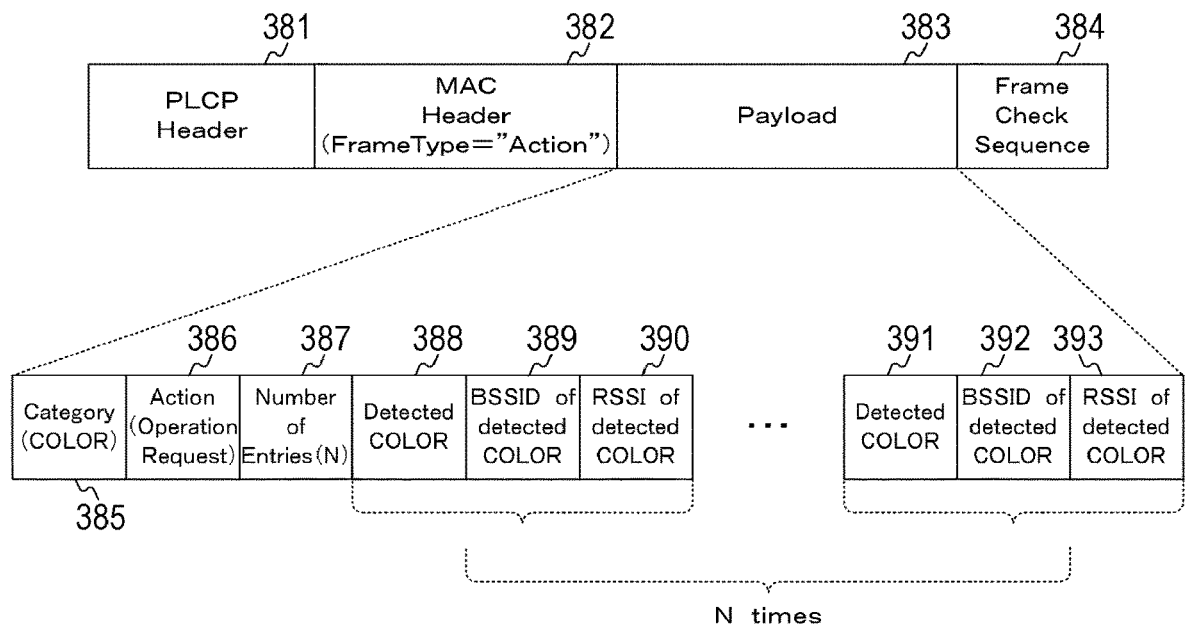
FIG. 23 is a diagram showing an example of a format of a COLOR operation start request frame exchanged between the apparatuses constituting the communication system 10 according to the fourth embodiment of the present technology.

FIG. 23 is a diagram showing an example of a format of a COLOR operation start request frame exchanged between the apparatuses constituting the communication system 10 according to the fourth embodiment of the present technology The COLOR operation start request frame includes a PLCP Header 381, a MAC Header 382, a Payload 383, and a Frame Check Sequence (FCS) 384.

The Payload 383 includes a Category 385, an Action 386, a Number of Entries 387, Detected COLORs 388, 391, BSSIDs of detected COLORs 389, 392, and RSSIs of detected COLORs 390, 393.

The Category 385 stores information indicating that it is a COLOR operation start request frame.

The Action 386 stores information indicating that a COLOR operation start is requested.

The Number of Entries 387 stores the number of combinations N of pieces of information stored in the COLOR operation start request frame. More specifically, the Number of Entries 387 stores the number of combinations N of the Detected COLORs, the BSSIDs of detected COLORs, and the RSSIs of detected COLORs.

The Detected COLORs 388, 391 store information about overlapping BSS COLORs detected by the slave station.

The BSSIDs of detected COLORs 389, 392 store BSSIDs of the networks transmitting BSS COLORs detected by the slave station.

The RSSIs of detected COLORs 390, 393 store RSSIs of the packets from OBSSes of the overlapping BSS COLORs detected by the slave station.

Further, in order to always receive the COLOR information obtaining request frame, the PLCP Header 381 does not store the COLOR information (BSS COLOR) about the BSS in question.

[Example of Operation of COLOR Operation Start Request Processing (Slave Station)]

Figure 24:
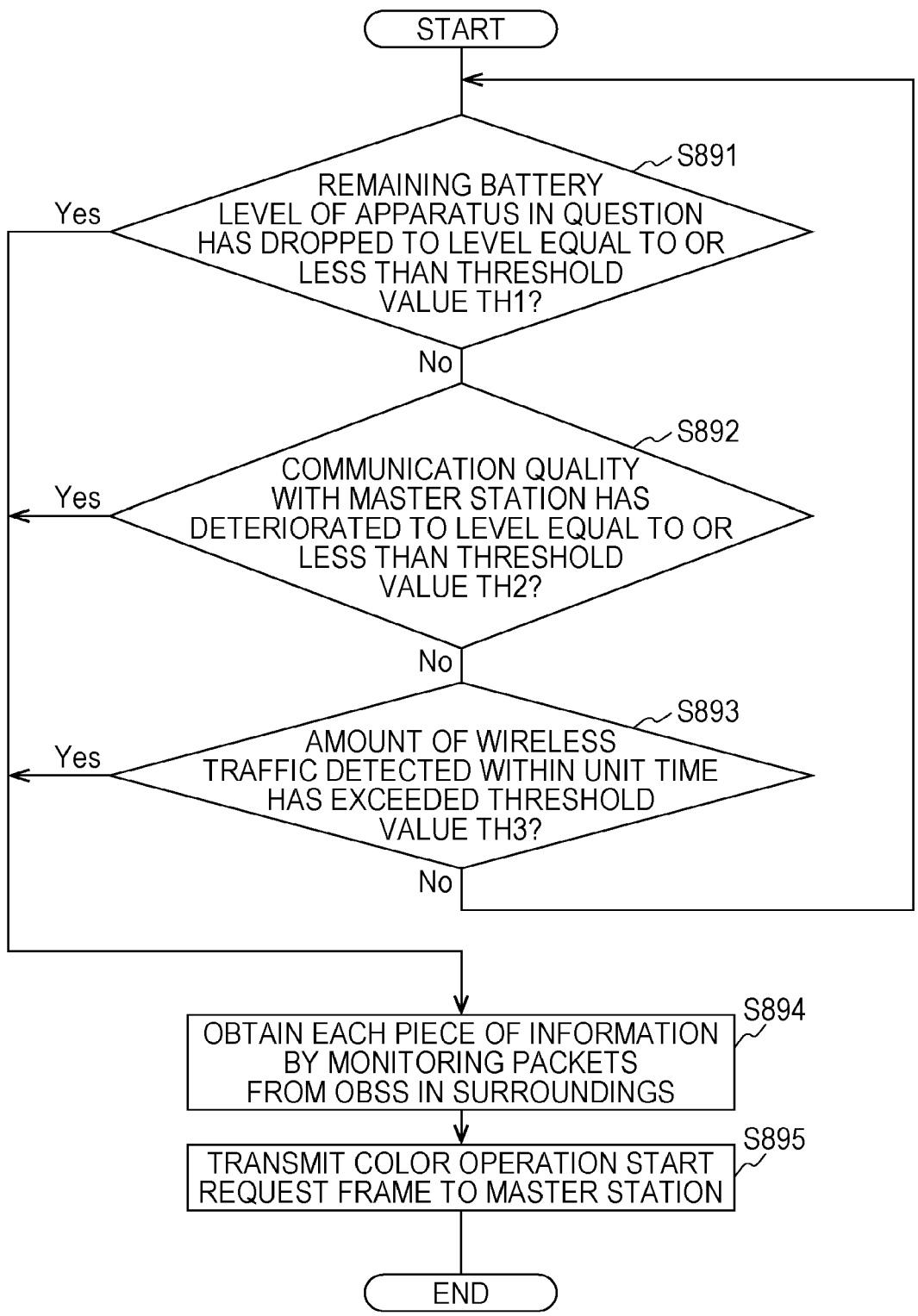
FIG. 24 is a flowchart showing an example of processing procedure of COLOR operation start request processing performed by the information processing apparatus 100 according to the fourth embodiment of the present technology.

FIG. 24 is a flowchart showing an example of processing procedure of COLOR operation start request processing performed by the information processing apparatus 100 according to the fourth embodiment of the present technology. It should be noted that this example shows the example of the information processing apparatus 100, but other slave stations are also similar thereto.

First, the control unit of the information processing apparatus 100 determines whether a request has occurred to request operation of the packet filtering based on the BSS COLOR within the BSS in question (steps S891 to S893).

For example, the control unit of the information processing apparatus 100 determines whether or not the remaining battery level (remaining battery level) of the information processing apparatus 100 has dropped to a level equal to or less than the threshold value TH1 (step S891). In the case where the remaining battery power of the information processing apparatus 100 drops to a level equal to or less than the threshold value TH1 (step S891), the control unit of the information processing apparatus 100 determines whether a request has occurred to request operation of the packet filtering based on the BSS COLOR within the BSS in question. Then, the control unit of the information processing apparatus 100 monitors the packets from the surrounding OBSS (step S894)

More specifically, the control unit of the information processing apparatus 100 collects the COLOR information (BSS COLOR) used for the PLCP header of the detected packet (step S894). At the same time, the control unit of the information processing apparatus 100 extracts and collects the COLOR information (BSS COLOR) stored in the payload in the beacon of the detected OBSS (step S894). In this case, the control unit of the information processing apparatus 100 also collects the RSSI of the packet that has gathered such information, the BSSID and the like stored therein, and the like (step S894)

Subsequently, the control unit of the information processing apparatus 100 stores each pieces of information obtained (for example, already used BSS COLOR, BSSID related thereto, information about RSSI) into the COLOR operation start request frame (shown in FIG. 23), and transmits the COLOR operation start request frame to the master station (step S895).

In this case, in the case where the master station can take care of collection of each piece of information (for example, the used BSS COLORs in the surroundings) through monitoring, the monitor processing may be omitted. In this case, the information processing apparatus 100 transmits a COLOR operation start request frame storing only the request of the COLOR operation start.

Further, in the case where the remaining battery power of the information processing apparatus 100 is more than the threshold value TH1 (step S891), the control unit of the information processing apparatus 100 determines whether the communication quality with the master station has deteriorated to a level equal to or less than a threshold value TH2 (step S892). For example, the RSSI with the master station can be used as the communication quality with the master station. When the communication quality with the master station has dropped to a level equal to or less than the threshold value TH2 (step S892), the control unit of the information processing apparatus 100 determines that a request has occurred to request operation of the packet filtering based on the BSS COLOR within the BSS in question. Then, step S894 is subsequently performed.

In the case where the communication quality with the master station is better than the threshold value TH2 (step S891), the control unit of the information processing apparatus 100 determines whether the amount of the wireless traffic detected within the unit time has exceeded a threshold value TH3 (step S893). In the case where the amount of wireless traffic detected within unit time exceeds the threshold value TH3 (step S893), the control unit of the information processing apparatus 100 determines that a request has occurred to request operation of the packet filtering based on the BSS COLOR within the BSS in question. Then, step S894 is subsequently performed.

Further, in the case where the amount of wireless traffic detected within unit time is equal to or less than the threshold value TH3 (step S893), step S891 is subsequently performed.

As described above, for example, in the case where the slave station is a mobile device, and the remaining battery level of the slave station decreases, it may be desired to reduce the power consumption by starting the packet filtering, and in such case, it is possible to request the master station to start operation of the BSS COLOR. Likewise, for example, in the case where the communication quality with the master station is determined to have reduced, and in the case where the amount of wireless traffic detected within unit time increases, a request can be sent to the master station to start operation of the BSS COLOR.

[Example of Operation of COLOR Operation Start Request Processing (Master Station)]

Figure 25:
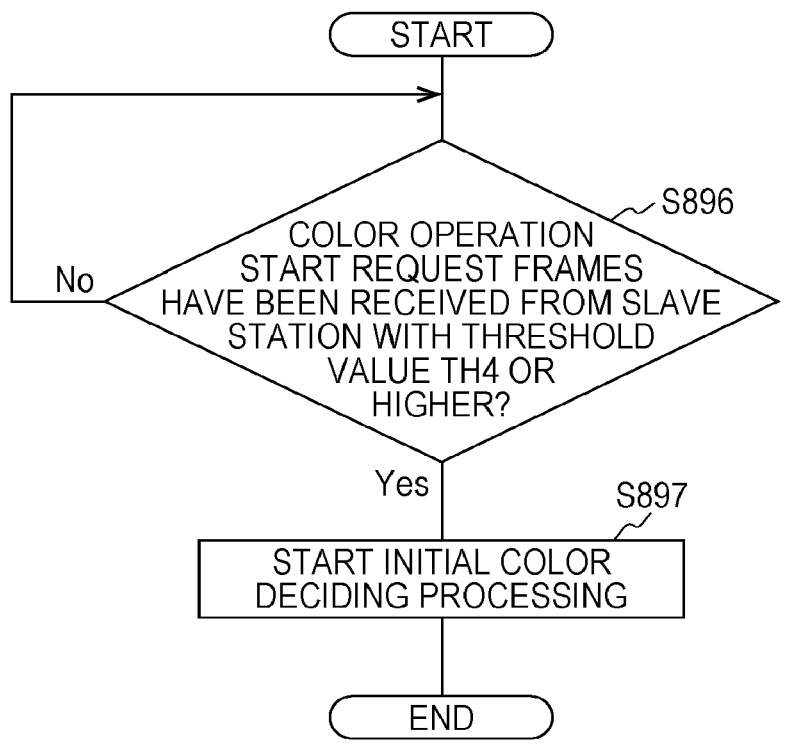
FIG. 25 is a flowchart showing an example of processing procedure of COLOR operation start request processing performed by the information processing apparatus 200 according to the fourth embodiment of the present technology.

FIG. 25 is a flowchart showing an example of processing procedure of COLOR operation start request processing performed by the information processing apparatus 200 according to the fourth embodiment of the present technology. It should be noted that this example shows the example of the information processing apparatus 200, but other master stations are also similar thereto.

First, the control unit 240 of the information processing apparatus 200 determines whether COLOR operation start request frames have been received from the slave station with the threshold value TH4 or higher (step S896). In this case, the threshold value TH4 may use a fixed value or may be a variable value. For example, the threshold value TH4 may be appropriately changed on the basis of the number of slave stations connected to the information processing apparatus 200, the communication environment around the information processing apparatus 200, and the like.

In the case where COLOR operation start request frames have not been received from the slave station with the threshold value TH4 or higher (step S896), monitoring is continued. On the other hand, in the case where COLOR operation start request frames have been received from the slave station with the threshold value TH4 or higher (step S896), the control unit 240 starts the initial COLOR deciding processing (step S897). More specifically, the control unit 240 starts the operation of the BSS COLOR in the BSS.

It should be noted that, this example shows an example in which the slave station performs the determination processing of the operation start request, and the master station starts the operation of the BSS COLOR in the BSS on the basis of the determination result. However, the master station also performs determination processing equivalent to the determination processing (for example, all, a part, or other determination is added) of the operation start request in slave station. Then, on the basis of the determination result (or the determination result of master station and the slave station), the operation of the BSS COLOR in the BSS may be started.

[Example of Initial COLOR Deciding Processing]

Basically, this is processing equivalent to the first embodiment of the present technology. At this occasion, in the case where the COLOR operation start request frame from the slave station stores the BSS COLOR already used in the OBSS, such information is also excluded from selection candidates of the initial COLORs.

[Example of Initial COLOR Sharing Processing and Example of COLOR Overlapping Detection Processing]

This is equivalent to the second embodiment of the present technology.

[Example of New COLOR Deciding Processing]

This is equivalent to the first embodiment of the present technology.

[Example of COLOR Update Notification Processing and Example of COLOR Update Reflecting Processing]

This is equivalent to the second embodiment of the present technology.

As described above, in the case where the BSS COLOR are overlapping between BSSes, it is possible to recover from the case of receiving arriving packets that are originally not necessary to be received, so that the communication efficiency can be improved.

It should be noted that in each embodiment of the present technology, each processing was described in phase units, but the combination of the phases may be combinations other than those described above. For example, a combination of multiple embodiments of the present technology can be applied to the combination of the phases.

Additionally, each embodiment of the present technology shows an example in which pieces of COLOR information (BSS COLORs) are given in units of infrastructure networks, but similar operations may also be performed in a mesh network. For example, in the infrastructure network, a corresponding COLOR is given to each BSSID. In contrast, in the mesh network, a corresponding COLOR is given to each Mesh ID, so that the embodiment can be applied in a manner similar to the infrastructure network.

As described above, according to the embodiment of the present technology, the filtering of the packets can be performed appropriately, and unnecessary reception can be terminated appropriately. As a result, the utilization efficiency of the wireless resource in the communication system can be improved. Further, the power consumption in the information processing apparatus (wireless communication apparatus) can be reduced.

4. Example of Application

The technique according to present disclosure can be applied to various products. For example, the information processing apparatuses 100 to 103, 200, 201 can be realized as mobile terminals such as a smartphone, a tablet Personal Computer (PC), a notebook PC, a portable game terminal, and a digital camera; fixed terminals such as a television receiver, a printer, a digital scanner, and a network storage; or in-vehicle terminals such as car navigation apparatuses. Additionally, the information processing apparatuses 100 to 103, 200, 201 can be realized as a terminal that performs Machine To Machine (M2M) communication (also referred to as an Machine Type Communication (MTC) terminal) such as a smart meter, a vending machine, a remote monitoring apparatus, a point of sale (POS) terminal, and the like. Further, the information processing apparatuses 100 to 103, 200, 201 may be wireless communication modules mounted on these terminals (for example, an integrated circuit module configured with one die).

On the other hand, for example, the information processing apparatuses 200, 201 may be realized as a wireless LAN access point (also referred to as a wireless base station) having a router function or not having any router function. On the other hand, the information processing apparatuses 200, 201 may be realized as a mobile wireless LAN router. Further, the information processing apparatuses 200, 201 may be wireless communication modules mounted on these apparatuses (for example, an integrated circuit module configured with one die).

4-1. First Example of Application

Figure 26:
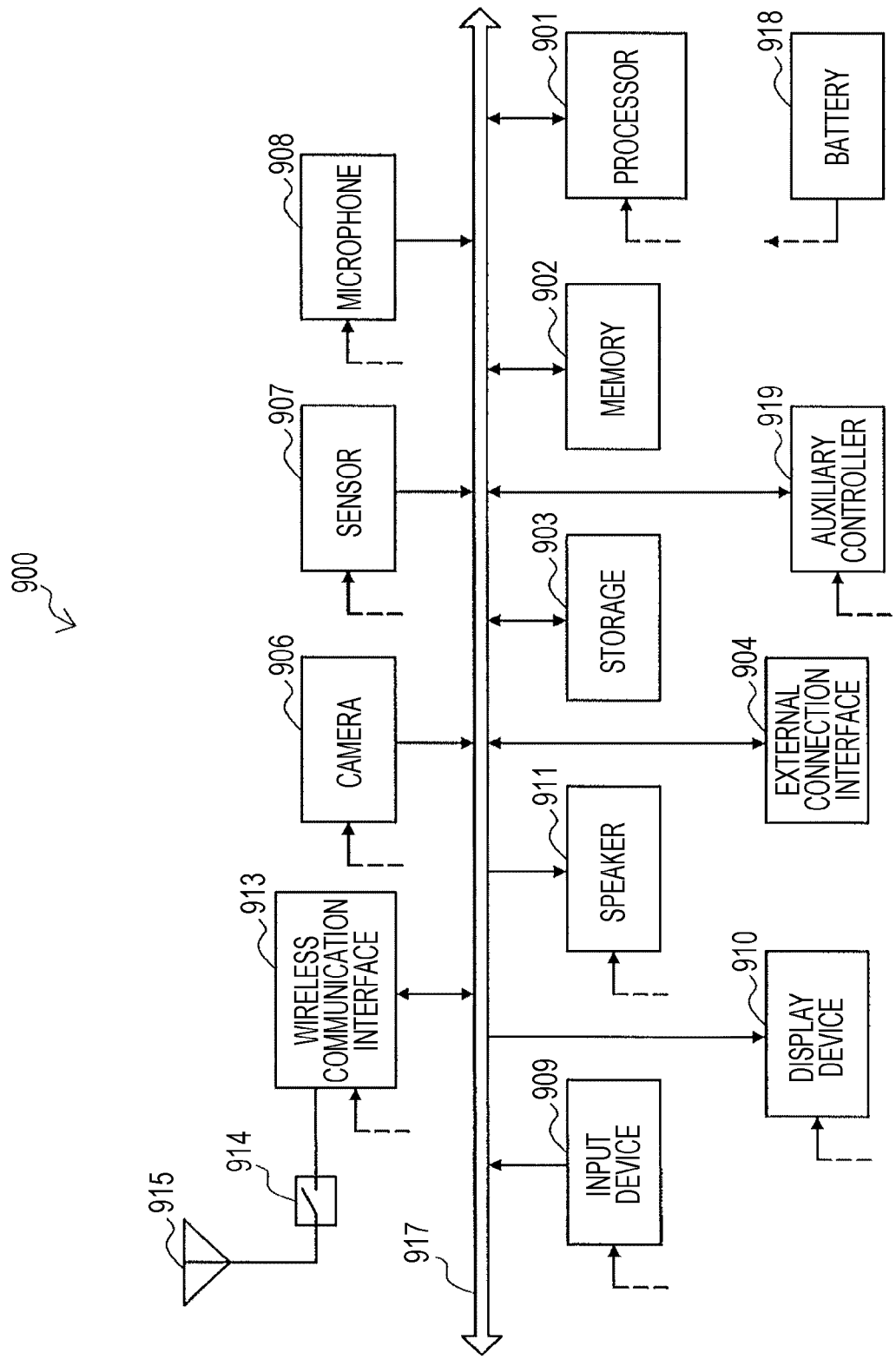
FIG. 26 is a block diagram showing an example of a schematic configuration of a smartphone.

FIG. 26 is a block diagram showing an example of a schematic configuration of a smartphone 900 to which a technique according to the present disclosure can be applied. The smartphone 900 includes a processor 901, a memory 902, a storage 903, an external connection interface 904, a camera 906, a sensor 907, a microphone 908, an input device 909, a display device 910, a speaker 911, a wireless communication interface 913, an antenna switch 914, an antenna 915, a bus 917, a battery 918, and an auxiliary controller 919.

The processor 901 may be, for example, a CPU (Central Processing Unit (CPU) or an System on Chip (SoC), and controls functions of the application layer and other layers of the smartphone 900. The memory 902 includes a Random Access Memory (RAM) and a Read Only Memory (ROM), and stores a program executed by the processor 901 and data. The storage 903 may include a storage medium such as a semiconductor memory or a hard disk.

The external connection interface 904 is an interface for connecting an external device such as a memory card or a Universal Serial Bus (USB) device to the smartphone 900.

The camera 906 has imaging elements such as, for example, a Charge Coupled Device (CCD) or a Complementary Metal Oxide Semiconductor (CMOS), and generates a captured image. The sensor 907 may include sensor groups such as, for example, a positioning sensor, a gyro sensor, a geomagnetic sensor, and an acceleration sensor. The microphone 908 converts voice input to the smartphone 900 into an audio signal. The input device 909 includes, for example, a touch sensor for detecting a touch on a screen of the display device 910, a keypad, a keyboard, a button, or a switch, and receives operation or information input from a user. The display device 910 has a screen such as a liquid crystal display (LCD) or an organic light emitting diode (OLED) display, to display an output image of the smartphone 900. The speaker 911 converts the audio signal output from smartphone 900 into a voice.

The wireless communication interface 913 supports one or more of the wireless LAN standards such as IEEE 802.11a, 11b, 11g, 11n, 11ac, and 11ad, and performs wireless communication. In the infrastructure mode, the wireless communication interface 913 can communicate with another apparatus via a wireless LAN access point. On the other hand, in direct communication modes such as ad-hoc mode or Wi-Fi Direct, the wireless communication interface 913 can directly communicate with other apparatuses. It should be noted that, in the Wi-Fi Direct, unlike the ad hoc mode, one of the two terminals operates as an access point, but communication is performed directly between the terminals. The wireless communication interface 913 typically may include a baseband processor, a radio frequency (RF) circuit, a power amplifier, and the like. The wireless communication interface 913 may be a one-chip module integrated with a memory for storing a communication control program, a processor for executing the program, and a related circuit. The wireless communication interface 913 may support a wireless LAN method but also other types of wireless communication methods such as a short-distance wireless communication method, a proximity wireless communication method, or a cellular communication method. The antenna switch 914 switches the connection destination of the antenna 915 to a plurality of circuits (for example, circuits for different wireless communication methods) included in the wireless communication interface 913. The antenna 915 has a single or plural antenna elements (for example, a plurality of antenna elements constituting MIMO antennas), and is used for transmission and reception of a wireless signal with the wireless communication interface 913.

It should be noted that the smartphone 900 is not limited to the example of FIG. 26, and the smartphone 900 may include multiple antennas (for example, an antenna for wireless LAN and ab antenna for proximity wireless communication method, and the like). In that case, the antenna switch 914 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 913, and the auxiliary controller 919 with each other. The battery 918 supplies electric power to each block of the smartphone 900 shown in FIG. 26 via the power supply line partially indicated by a broken line in the figure. The auxiliary controller 919 causes the minimum necessary function of smartphone 900 to be operated in, for example, sleep mode.

In the smartphone 900 shown in FIG. 26, the control unit 240 described using FIG. 2 may be implemented in the wireless communication interface 913. Further, at least some of these functions may be implemented in the processor 901 or the auxiliary controller 919.

It should be noted that the smartphone 900 may operate as a wireless access point (software AP) when the processor 901 executes the access point function at the application level. Further, the wireless communication interface 913 may have a wireless access point function.

4-2. Second Example of Application

Figure 27:
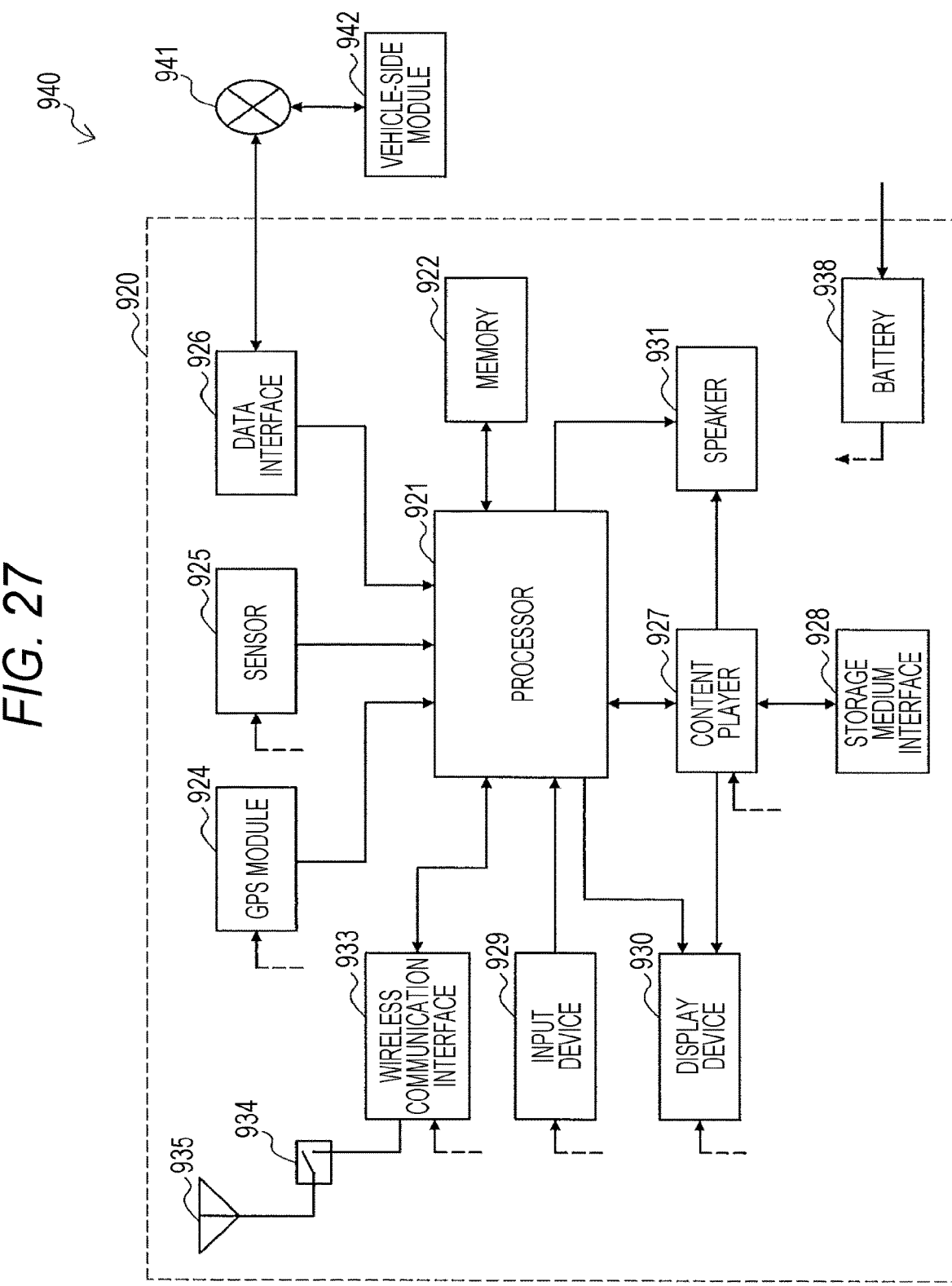
FIG. 27 is a block diagram showing an example of a schematic configuration of a car navigation apparatus.

FIG. 27 is a block diagram showing an example of a schematic configuration of a car navigation apparatus 920 to which a technique according to the present disclosure can be applied. The car navigation apparatus 920 includes a processor 921, a memory 922, a Global Positioning System (GPS) module 924, a sensor 925, a data interface 926, a content player 927, a storage medium interface 928, an input device 929, a display device 930, a speaker 931, a wireless communication interface 933, an antenna switch 934, an antenna 935, and a battery 938.

The processor 921 may be, for example, a CPU or an SoC, and controls the navigation function and other functions of the car navigation apparatus 920. The memory 922 includes a RAM and a ROM, and stores programs executed by the processor 921 and data.

The GPS module 924 measures the position (for example, latitude, longitude, and altitude) of the car navigation apparatus 920 using the GPS signals received from the GPS satellites. The sensor 925 may include a sensor group such as, for example, a gyro sensor, a geomagnetic sensor, and an atmospheric pressure sensor. The data interface 926 is connected to the in-vehicle network 941 via, for example, a terminal not shown, and obtains data generated by the vehicle such as the vehicle speed data.

The content player 927 plays the contents stored in the storage medium (for example, a CD or a DVD) inserted in the storage medium interface 928. The input device 929 includes, for example, a touch sensor for detecting a touch on the screen of the display device 930, a button, a switch, and the like, and accepts an operation from the user or an information input. The display device 930 has a screen such as an LCD or an OLED display and displays a navigation function or an image of the content to be reproduced. The speaker 931 outputs the sound of navigation function or the content to be reproduced.

The wireless communication interface 933 supports one or more of the wireless LAN standards such as IEEE 802.11a, 11b, 11g, 11n, 11ac, and 11ad, and performs wireless communication. In the infrastructure mode, the wireless communication interface 933 can communicate with another apparatus via a wireless LAN access point. On the other hand, in direct communication modes such as ad-hoc mode or Wi-Fi Direct, the wireless communication interface 933 can directly communicate with other apparatuses. The wireless communication interface 933 typically may include a baseband processor, an RF circuit, a power amplifier, and the like. The wireless communication interface 933 may be a one-chip module integrated with a memory for storing a communication control program, a processor for executing the program, and a related circuit. The wireless communication interface 933 may support a wireless LAN method but also other types of wireless communication methods such as a short-distance wireless communication method, a proximity wireless communication method, or a cellular communication method. The antenna switch 934 switches the connection destination of the antenna 935 to a plurality of circuits included in the wireless communication interface 933. The antenna 935 has a single or plural antenna elements, and is used for transmission and reception of a wireless signal with the wireless communication interface 933.

It should be noted that the car navigation apparatus 920 is not limited to the example of FIG. 27, and the car navigation apparatus 920 may include multiple antennas. In that case, the antenna switch 934 may be omitted from the configuration of the car navigation apparatus 920.

The battery 938 supplies electric power to each block of the car navigation apparatus 920 shown in FIG. 27 via the power supply line partially indicated by a broken line in the figure. Further, the battery 938 accumulates electric power supplied from the vehicle-side.

In the car navigation apparatus 920 shown in FIG. 27, the control unit 240 described using FIG. 2 may be implemented in the wireless communication interface 933. Further, at least some of these functions may be implemented in the processor 921.

Further, the wireless communication interface 933 may operate as the information processing apparatuses 200 and 201 described above, and may provide a wireless connection to the terminal possessed by the user on the vehicle.

Further, the technique of the present disclosure can be realized with an in-vehicle system (or vehicle) 940 including one or more blocks of the above-described car navigation apparatus 920, an in-vehicle network 941, and a vehicle-side module 942. The vehicle-side module 942 generates vehicle-side data such as vehicle speed, engine speed or failure information, and outputs the generated data to the in-vehicle network 941.

4-3. Third Example of Application

Figure 28:
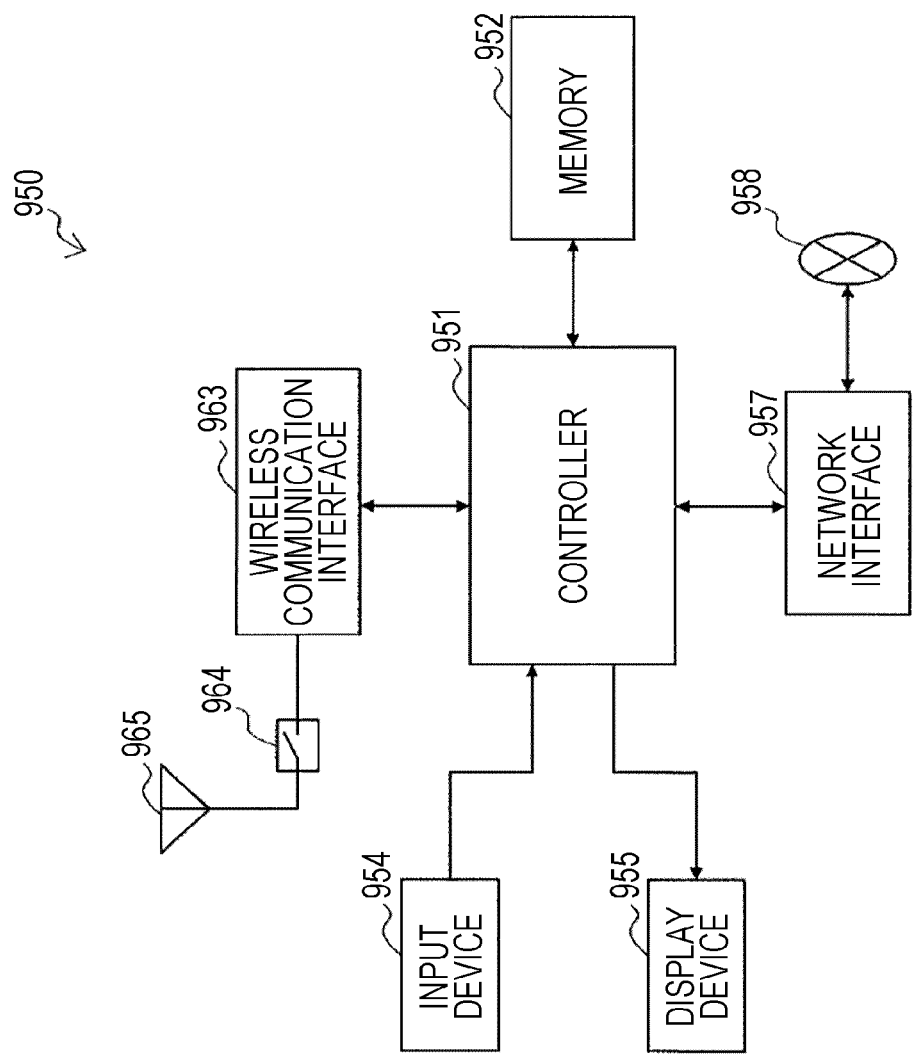
FIG. 28 is a block diagram showing an example of a schematic configuration of the wireless access point.

FIG. 28 is a block diagram showing an example of a schematic configuration of a wireless access point 950 to which a technique according to the present disclosure can be applied. The wireless access point 950 includes a controller 951, a memory 952, an input device 954, a display device 955, a network interface 957, a wireless communication interface 963, an antenna switch 964, and an antenna 965.

The controller 951 may be, for example, a CPU or a Digital Signal Processor (DSP), and operates various functions (for example, access restriction, routing, encryption, firewall, and log management) of an Internet Protocol (IP) layer and layers above the IP layer of the wireless access point 950. The memory 952 includes a RAM and a ROM, and the memory 952 stores the programs executed by the controller 951 and various control data (for example, a terminal list, a routing table, an encryption key, a security setting, a log, and the like)

The input device 954 includes, for example, a button, a switch, or the like, and accepts an operation from the user. The display device 955 includes an LED lamp and the like and displays the operation status of the wireless access point 950.

The network interface 957 is a wired communication interface with which the wireless access point 950 connects to the wired communication network 958. The network interface 957 may have a plurality of connection terminals. The wired communication network 958 may be a LAN such as Ethernet (registered trademark) or a wide area network (WAN).

The wireless communication interface 963 supports one or more of the wireless LAN standards such as IEEE 802.11a, 11b, 11g, 11n, 11ac, and 11ad, and provides wireless connection as an access point to a terminal in proximity. The wireless communication interface 963 typically may include a baseband processor, an RF circuit, a power amplifier, and the like. The wireless communication interface 963 may be a one-chip module integrated with a memory for storing a communication control program, a processor for executing the program, and a related circuit. The antenna switch 964 switches the connection destination of the antenna 965 to a plurality of circuits included in the wireless communication interface 963. The antenna 965 has a single or plural antenna elements, and is used for transmission and reception of a wireless signal with the wireless communication interface 963.

In the wireless access point 950 shown in FIG. 28, the control unit 240 described using FIG. 2 may be implemented in the wireless communication interface 963. Further, at least some of these functions may be implemented in the controller 951.

It should be noted that the above-mentioned embodiments show examples for embodying the present technology, and the matters in the embodiments and the invention specifying matters in the claims have correspondence relationships with each other. Likewise, the invention specifying matters in the claims and the matters in the embodiment of the present technology denoted with the same names have correspondence relationships. However, the present technology is not limited to the embodiments, but can be embodied by applying various modifications to the embodiment without departing from the gist thereof.

Further, the processing procedure described in the above embodiments may be understood as a method having these series of procedures, or may be understood as a program for causing a computer to execute these series of procedures, a recording medium or a recording medium storing the program. Examples of recording media include a Compact Disc (CD), an MiniDisc (MD), a Digital Versatile Disc (DVD), a memory card, a Blu-ray Disc (Blu-ray (registered trademark) Disc), and the like.

It should be noted that the effects described in this specification are merely examples, and are not intended to be limited, and other effects may be provided.

It should be noted that the present technology can be configured as follows.

(1)

An information processing apparatus including a control unit, in which in a case where a first physical layer network identifier for identifying a first network to which an apparatus in question belongs is determined to match a second physical layer network identifier for identifying a second network to which the apparatus in question does not belong, the control unit changes the first physical layer network identifier and performs control to transmit change information about the change to another information processing apparatus.

(2)

The information processing apparatus according to (1), in which in a case where a value of the first physical layer network identifier existing in a physical header of a received packet is the same as a value of the first physical layer network identifier used in the first network, and a value of a data link layer network identifier existing in a MAC header is different from a value of a data link layer network identifier for identifying the first network, the control unit determines that the first physical layer network identifier and the second physical layer network identifier match each other.

(3)

The information processing apparatus according to (1), in which in a case where information about a physical layer network identifier described in a payload of a received beacon packet is the same as information about the first physical layer network identifier used in the first network, and information about a data link layer network identifier existing in a MAC header is different from information about a data link layer network identifier for identifying the first network, the control unit determines that the first physical layer network identifier and the second physical layer network identifier match each other.

(4)

The information processing apparatus according to (1), in which in a case where the control unit receives a match detection notification of the first physical layer network identifier and the second physical layer network identifier from another information processing apparatus which belongs to the first network, the control unit determines that the first physical layer network identifier and the second physical layer network identifier match each other.

(5)

The information processing apparatus according to any of (1) to (4), in which, on the basis of notification information transmitted from another information processing apparatus which belongs to another network including the second network, the control unit extracts a physical layer network identifier used in the another network, and adopts a physical layer network identifier other than the extracted physical layer network identifier as a changed first physical layer network identifier.

(6)

The information processing apparatus according to (5), in which the control unit randomly sets a monitor time of the notification information for extracting a physical layer network identifier used in the another network.

(7)

The information processing apparatus according to (5) or (6), in which in a case where there does not exist any physical layer network identifier other than the extracted physical layer network identifier, the control unit adopts, as a changed first physical layer network identifier, a physical layer network identifier used in a network including another information processing apparatus transmitting notification information with a least reception strength.

(8)

The information processing apparatus according to any of (1) to (7), in which in a case where the first physical layer network identifier and the second physical layer network identifier match each other, the control unit does not change the first physical layer network identifier when notification information transmitted from another information processing apparatus which belongs to the second network includes change information for changing the second physical layer network identifier.

(9)

The information processing apparatus according to any of (1) to (8), in which the control unit transmits the change information including designation information for designating any one of a start timing for starting use of the changed first physical layer network identifier and an end timing for ending use of the not-yet-updated first physical layer network identifier.

(10)

The information processing apparatus according to (9), in which in a case where there exists an information processing apparatus which belongs to the first network and which is in a Power Save state, the control unit sets a time equal to or more than a DTIM interval as a time from the start timing to the end timing.

(11)

The information processing apparatus according to any of (1) to (10), in which the control unit transmits the change information with a beacon in which information about the first physical layer network identifier is not stored in a physical header.

(12)

The information processing apparatus according to any of (1) to (11), in which before the control unit receives a packet in which the changed first physical layer network identifier is applied to the physical header from all of the information processing apparatuses which belong to the first network, the control unit adopts, as a reception target, a packet applied with any one of the not-yet-changed first physical layer network identifier and the changed first physical layer network identifier.

(13)

The information processing apparatus according to any of (1) to (12), in which in response to a request from another information processing apparatus which belongs to the first network, the control unit transmits information about the first physical layer network identifier to the another information processing apparatus.

(14)

An information processing apparatus including a control unit, in which in a case where change information for changing a first physical layer network identifier for identifying a first network to which an apparatus in question belongs is received from another information processing apparatus which belongs to the first network, the control unit performs control to change a condition for terminating reception processing of a packet on the basis of the change information in a middle of the reception processing.

(15)

The information processing apparatus according to (14), in which in a case where the change information includes designation information for designating a start timing for starting use of the changed first physical layer network identifier, the control unit performs reception processing of a packet in which the changed first physical layer network identifier is included in a physical header after the start timing.

(16)

The information processing apparatus according to (14) or (15), in which in a case where the change information includes designation information for designating an end timing for ending use of the changed first physical layer network identifier, the control unit performs reception processing of a packet in which the not-yet-changed first physical layer network identifier is included in a physical header until the end timing.

(17)

The information processing apparatus according to any of (14) to (16), in which in a case where the control unit is unable to receive, from the another information processing apparatus, a packet in which the first physical layer network identifier is included in the physical header for a certain period of time, the control unit transmits a request information to the another information processing apparatus in order to confirm the first physical layer network identifier.

(18)

The information processing apparatus according to (17), in which while the control unit waits for a response to the request information, the control unit performs reception processing of all the detected packets.

(19)

The information processing apparatus according to any of (14) to (18), in which in a case where it is detected that the first physical layer network identifier matches a second physical layer network identifier for identifying a second network to which the apparatus in question does not belong, notification information for notifying the detection result is transmitted to the another information processing apparatus.

(20)

The information processing apparatus according to (19), in which in a case where a value of the first physical layer network identifier existing in a physical header is the same as a value of the first physical layer network identifier used in the first network, and a packet in which a value of a data link layer network identifier existing in a MAC header and a value of a data link layer network identifier for identifying the first network are different from each other is received, the control unit detects that that the first physical layer network identifier matches the second physical layer network identifier.

REFERENCE SIGNS LIST

10 Communication system
100 to 103, 200, 201 Information processing apparatus
210 Data processing unit
220 Modulation and demodulation unit
230 Wireless interface unit
231 Antenna
240 Control unit
250 Memory
900 Smartphone
901 Processor
902 Memory
903 Storage
904 External connection interface
906 Camera
907 Sensor
908 Microphone
909 Input device
910 Display device
911 Speaker
913 Wireless communication interface
914 Antenna switch
915 Antenna
917 Bus
918 Battery
919 Auxiliary controller
920 Car navigation apparatus
921 Processor
922 Memory
924 GPS module
925 Sensor
926 Data interface
927 Content player
928 Storage medium interface
929 Input device
930 Display device
931 Speaker
933 Wireless communication interface
934 Antenna switch
935 Antenna
938 Battery
941 In-vehicle network
942 Vehicle-side module
950 Wireless access point
951 Controller
952 Memory
954 Input device
955 Display device
957 Network interface
958 Wired communication network 963 Wireless communication interface
964 Antenna switch
965 Antenna

The invention claimed is:

1. An information processing apparatus comprising:
processing circuitry configured to
   set a first physical layer network identifier identifying a first network which the information processing apparatus belongs;
   detect that a second physical layer network identifier for a second network matches the first physical layer network identifier; and
   in response to the detection,
      change the first physical layer network identifier to a third physical layer network identifier identifying the first network at a first timing, and
      transmit a beacon frame that includes change information including the third physical layer network identifier and the first physical layer network identifier, and a data link layer network identifier identifying the first network, a first timing indicating an end for use of the first physical layer network identifier and a starting use of the third physical layer network identifier,
wherein the processing circuitry sets a monitor time of the notification information for extracting a physical layer network identifier used in the other network, and
wherein the information processing apparatus detects that the second physical layer network identifier matches the first physical layer network identifier,
when a first wireless communication device belonging to the first network transmits the notification information,
or when the information processing apparatus receives a packet with the second physical layer network identifier matching the first physical layer network identifier, and a data link layer network identifier identifying the second network.

2. The information processing apparatus according to claim wherein the first wireless communication device determines that a value of the first physical layer network identifier existing in a physical header of a received packet is the same as a value of the first physical layer network identifier used in the first network, and a value of a data link layer network identifier existing in a MAC header is different from a value of the data link layer network identifier for identifying the first network, the processing circuitry determines that the first physical layer network identifier and the second physical layer network identifier match each other.

3. The information processing apparatus according to claim 1, wherein responsive to determining that the first physical layer network identifier and the second physical layer network identifier match each other, the processing circuitry does not change the first physical layer network identifier responsive to determining that notification information transmitted from the other information processing apparatus which belongs to the second network includes change information for changing the second physical layer network identifier.

4. The information processing apparatus according to claim 1, wherein the processing circuitry transmits the change information with a beacon in which information about the first physical layer network identifier is not stored in a physical header.

5. The information processing apparatus according to claim 1, wherein before the processing circuitry receives a packet in which the third physical layer network identifier is applied to a physical header of the packet from all information processing apparatuses which belong to the first network, the processing circuitry receive, as a reception target, a packet applied with any one of the first physical layer network identifier and the third physical layer network identifier.

6. The information processing apparatus according to claim 1, wherein in response to a request from the other information processing apparatus which belongs to the first network, the processing circuitry transmits information about the first physical layer network identifier to the other information processing apparatus.

7. The information processing apparatus according to claim 1, wherein the first physical layer network identifier is a first BSS COLOR, the second physical layer network identifier is a second BSS COLOR, and the third physical layer network identifier is a third BSS COLOR.

8. The information processing apparatus according to claim 1, wherein when the information processing apparatus detects the physical layer network identifier used in the other network, the information processing apparatus changes the third physical layer network identifier so it would not overlap with the physical layer network identifier used in the other network.

9. The information processing apparatus according to claim 1, wherein when the notification information from the first wireless communication device includes a physical layer network identifier used in another network, the information processing apparatus changes the third physical layer network identifier so it would not overlap with the physical layer network identifier used in the other network.

* * * * *